(12) United States Patent
Foote et al.

(10) Patent No.: US 11,325,535 B2
(45) Date of Patent: May 10, 2022

(54) EXTERIOR REARVIEW MIRROR ASSEMBLY

(71) Applicant: Magna Mirrors of America, Inc., Holland, MI (US)

(72) Inventors: Keith D. Foote, Caledonia, MI (US); Darryl P. De Wind, West Olive, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 738 days.

(21) Appl. No.: 16/158,522

(22) Filed: Oct. 12, 2018

(65) Prior Publication Data
US 2019/0039522 A1    Feb. 7, 2019

Related U.S. Application Data

(63) Continuation of application No. 14/618,159, filed on Feb. 10, 2015, now Pat. No. 10,099,618, and a
(Continued)

(51) Int. Cl.
*B60R 1/076* (2006.01)
*B60R 1/074* (2006.01)

(52) U.S. Cl.
CPC ............. *B60R 1/076* (2013.01); *B60R 1/074* (2013.01)

(58) Field of Classification Search
CPC .... B60R 1/06; B60R 1/07; B60R 1/12; B60R 1/074; B60R 1/076; B60R 1/04;
(Continued)

(56) References Cited

U.S. PATENT DOCUMENTS 1,114,559 A   10/1914  Weed
2,307,568 A    1/1943  Colbert
(Continued)

FOREIGN PATENT DOCUMENTS

DE     1530861 A1    6/1969
DE     1815368 B     4/1970
(Continued)

OTHER PUBLICATIONS

Yi Zhang et al., Basic Kinematics of Constrained Rigid Bodies, in Introduction to Mechanisms, Carnegie Mellon University, https://www.cs.cmu.edu/~rapidproto/mechanisms/chpt4.html.
(Continued)

*Primary Examiner* — Stephone B Allen
*Assistant Examiner* — Rahman Abdur
(74) *Attorney, Agent, or Firm* — Honigman LLP

(57) ABSTRACT

An exterior rearview mirror assembly configured for mounting at an exterior side portion of a vehicle includes a mounting portion, a mirror head and an electrically-operated actuator. The mounting portion is configured for attachment at an exterior side portion of a vehicle. The mirror head includes a mirror casing and a mirror reflective element. The mirror head is attached at the electrically-operated actuator. With the mounting portion of the exterior rearview mirror assembly attached at the exterior side portion of the vehicle, the electrically-operated actuator is electrically operable to move the mirror reflective element and the mirror casing together in tandem to vertically and horizontally adjust a field of view of a driver of the vehicle who is viewing the mirror reflective element.

65 Claims, 26 Drawing Sheets

Related U.S. Application Data continuation-in-part of application No. 15/978,425, filed on May 14, 2018, now Pat. No. 10,913,395, which is a continuation of application No. 15/822,630, filed on Nov. 27, 2017, now Pat. No. 9,969,334, which is a continuation of application No. 14/380,464, filed as application No. PCT/US2013/027346 on Feb. 22, 2013, now Pat. No. 9,827,913, said application No. 14/380,464 is a continuation-in-part of application No. 14/357,025, filed as application No. PCT/US2012/064398 on Nov. 9, 2012, now Pat. No. 9,346,403, said application No. 14/380,464 is a continuation-in-part of application No. 13/023,747, filed on Feb. 9, 2011, now Pat. No. 8,915,601.

(60) Provisional application No. 62/049,641, filed on Sep. 12, 2014, provisional application No. 61/938,843, filed on Feb. 12, 2014, provisional application No. 61/758,536, filed on Jan. 30, 2013, provisional application No. 61/739,986, filed on Dec. 20, 2012, provisional application No. 61/705,876, filed on Sep. 26, 2012, provisional application No. 61/697,554, filed on Sep. 6, 2012, provisional application No. 61/665,509, filed on Jun. 28, 2012, provisional application No. 61/664,438, filed on Jun. 26, 2012, provisional application No. 61/647,179, filed on May 12, 2012, provisional application No. 61/614,877, filed on Mar. 23, 2012, provisional application No. 61/601,756, filed on Feb. 22, 2012, provisional application No. 61/590,578, filed on Jan. 25, 2012, provisional application No. 61/565,541, filed on Dec. 1, 2011, provisional application No. 61/558,623, filed on Nov. 11, 2011, provisional application No. 61/303,042, filed on Feb. 10, 2010.

(58) Field of Classification Search
CPC ......... B60R 1/072; B60R 1/087; B60R 1/078; B60R 1/1207; B60R 1/088; B60R 1/00; B60R 1/082; B60R 1/02; B60R 11/04; B60R 1/10; B60R 1/08; B60Q 1/2665; B60Q 1/38; H04N 7/183; G06F 3/047
USPC .................. 359/841–844, 872–877
See application file for complete search history.

(56) References Cited

U.S. PATENT DOCUMENTS

| | | |
|---|---|---|
| 2,552,074 A | 5/1951 | Thompson |
| 2,839,965 A | 6/1958 | Budreck |
| 2,969,715 A | 1/1961 | Mosby |
| 3,119,591 A | 1/1964 | Malecki |
| 3,407,684 A | 10/1968 | Van Noord |
| 3,459,470 A | 8/1969 | Hahn |
| 3,549,243 A | 12/1970 | Horwiti et al. |
| 3,575,496 A | 4/1971 | Pollock et al. |
| 3,711,179 A | 1/1973 | Takeda |
| 4,470,323 A | 9/1984 | Manzoni |
| 4,477,149 A | 10/1984 | Crespy |
| 4,512,633 A | 4/1985 | Manzoni |
| 4,558,930 A | 12/1985 | Deedreek |
| 4,699,024 A | 10/1987 | Iida et al. |
| 4,826,289 A | 5/1989 | Vandenbrink et al. |
| 4,832,477 A | 5/1989 | Torii et al. |
| 4,936,670 A | 6/1990 | Yoo |
| 4,940,321 A | 7/1990 | Yoshida |
| 4,991,950 A | 2/1991 | Lang et al. |
| 5,005,797 A | 4/1991 | Maekawa et al. |
| 5,190,499 A | 3/1993 | Mori et al. |
| 5,210,651 A | 5/1993 | Shibuya et al. |
| 5,343,333 A | 8/1994 | Nagayama et al. |
| 5,371,659 A | 12/1994 | Pastrick et al. |
| 5,424,898 A | 6/1995 | Larson et al. |
| 5,473,476 A | 12/1995 | Fujita |
| 5,477,390 A | 12/1995 | Boddy et al. |
| 5,489,080 A | 2/1996 | Allen |
| 5,497,306 A | 3/1996 | Pastrick |
| 5,513,048 A | 4/1996 | Chen |
| 5,546,239 A | 8/1996 | Lewis |
| 5,572,376 A | 11/1996 | Pace |
| 5,579,178 A | 11/1996 | Mochizuki |
| 5,624,176 A | 4/1997 | O'Farrell et al. |
| 5,659,423 A | 8/1997 | Schierbeek et al. |
| 5,669,699 A | 9/1997 | Pastrick et al. |
| 5,703,731 A | 12/1997 | Boddy et al. |
| 5,786,772 A | 7/1998 | Schofield et al. |
| 5,796,176 A | 8/1998 | Kramer et al. |
| 5,823,654 A | 10/1998 | Pastrick et al. |
| 5,864,435 A | 1/1999 | Toyama |
| 5,900,999 A | 5/1999 | Huizenga et al. |
| 5,903,402 A | 5/1999 | Hoek |
| 5,929,786 A | 7/1999 | Schofield et al. |
| 5,949,591 A | 9/1999 | Whitehead |
| 5,969,890 A | 10/1999 | Whitehead |
| 5,986,364 A | 11/1999 | Bingle et al. |
| 6,146,003 A | 11/2000 | Thau |
| 6,170,957 B1 | 1/2001 | Kaspar |
| 6,176,602 B1 | 1/2001 | Pastrick et al. |
| 6,198,409 B1 | 3/2001 | Schofield et al. |
| 6,213,612 B1 | 4/2001 | Schnell et al. |
| 6,227,689 B1 | 5/2001 | Miller |
| 6,229,226 B1 | 5/2001 | Kramer et al. |
| 6,239,928 B1 | 5/2001 | Whitehead et al. |
| 6,243,218 B1 | 6/2001 | Whitehead |
| 6,270,227 B1 | 8/2001 | Tsuyama |
| 6,276,821 B1 | 8/2001 | Pastrick et al. |
| 6,312,135 B1 | 11/2001 | Polzer |
| 6,325,518 B1 | 12/2001 | Whitehead et al. |
| 6,362,548 B1 | 3/2002 | Bingle et al. |
| 6,439,755 B1 | 8/2002 | Fant, Jr. et al. |
| 6,467,920 B2 | 10/2002 | Schnell et al. |
| 6,481,878 B2 | 11/2002 | Thau |
| 6,501,387 B2 | 12/2002 | Skiver et al. |
| 6,522,451 B1 | 2/2003 | Lynam |
| 6,582,109 B2 | 6/2003 | Miller |
| 6,672,731 B2 | 1/2004 | Schnell et al. |
| 6,682,200 B2 | 1/2004 | Tsuyama et al. |
| 6,685,864 B2 | 2/2004 | Bingle et al. |
| 6,690,268 B2 * | 2/2004 | Schofield .................. B60R 1/04 340/438 |
| 6,698,905 B1 | 3/2004 | Whitehead |
| 6,717,712 B2 | 4/2004 | Lynam et al. |
| 6,755,544 B2 | 6/2004 | Schnell et al. |
| 6,847,288 B1 | 1/2005 | Baschnagel, III |
| 6,871,970 B2 | 3/2005 | Georges |
| 6,882,287 B2 | 4/2005 | Schofield |
| 6,916,100 B2 | 7/2005 | Pavao |
| 6,932,497 B1 | 8/2005 | Huang |
| 7,035,678 B2 | 4/2006 | Lynam et al. |
| 7,038,577 B2 | 5/2006 | Pawlicki et al. |
| 7,070,287 B2 | 7/2006 | Foote et al. |
| 7,073,914 B2 | 7/2006 | Pavao |
| 7,080,914 B1 | 7/2006 | Boddy |
| 7,083,312 B2 * | 8/2006 | Pastrick ............... B60Q 1/2665 116/54 |
| 7,093,946 B2 | 8/2006 | Barve et al. |
| 7,104,663 B2 | 9/2006 | Whitehead |
| 7,126,456 B2 | 10/2006 | Boddy et al. |
| 7,159,992 B2 | 1/2007 | Foote |
| 7,178,925 B1 | 2/2007 | Tidwell |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,267,449 B1 | 9/2007 | Boddy et al. |
| 7,287,867 B2 | 10/2007 | Wellington et al. |
| 7,289,037 B2 | 10/2007 | Uken et al. |
| 7,314,285 B2 | 1/2008 | Ruse et al. |
| 7,322,710 B2 | 1/2008 | Foote et al. |
| 7,338,177 B2 | 3/2008 | Lynam |

(56) References Cited

U.S. PATENT DOCUMENTS

| | | | |
|---|---|---|---|
| 7,342,707 B2* | 3/2008 | Roberts | F21S 43/14 |
| | | | 359/267 |
| 7,370,985 B2 | 5/2008 | Boddy et al. | |
| 7,492,281 B2 | 2/2009 | Lynam et al. | |
| 7,581,859 B2 | 9/2009 | Lynam | |
| 7,626,749 B2 | 12/2009 | Baur et al. | |
| 7,720,580 B2 | 5/2010 | Higgins-Luthman | |
| 7,722,199 B2 | 5/2010 | DeWard et al. | |
| 7,748,856 B2 | 7/2010 | Zhao | |
| 7,777,611 B2 | 8/2010 | Desai | |
| 7,944,371 B2 | 5/2011 | Foote et al. | |
| 8,049,640 B2 | 11/2011 | Uken et al. | |
| 8,262,240 B2 | 9/2012 | Negel | |
| 8,764,256 B2 | 7/2014 | Foote et al. | |
| 8,915,601 B2 | 12/2014 | Foote et al. | |
| 9,067,541 B2 | 6/2015 | Sobecki et al. | |
| 9,174,578 B2 | 11/2015 | Uken et al. | |
| 9,827,913 B2 | 11/2017 | De Wind et al. | |
| 9,969,334 B2 | 5/2018 | De Wind et al. | |
| 10,099,618 B2 | 10/2018 | Foote et al. | |
| 10,261,648 B2 | 4/2019 | Uken et al. | |
| 2001/0015862 A1 | 8/2001 | Lynam et al. | |
| 2002/0063978 A1 | 5/2002 | Guttenberger et al. | |
| 2002/0141085 A1 | 10/2002 | Whitehead et al. | |
| 2003/0001301 A1 | 1/2003 | Duroux et al. | |
| 2003/0202263 A1* | 10/2003 | Georges | B60R 1/0612 |
| | | | 359/871 |
| 2004/0196578 A1 | 10/2004 | Dumont et al. | |
| 2005/0243449 A1* | 11/2005 | Pavao | B60R 1/025 |
| | | | 359/877 |
| 2006/0061008 A1 | 3/2006 | Kamer et al. | |
| 2006/0285254 A1* | 12/2006 | Ruse | B60R 1/076 |
| | | | 360/244.5 |
| 2007/0002477 A1 | 1/2007 | Whitehead | |
| 2007/0058257 A1* | 3/2007 | Lynam | B60R 1/0602 |
| | | | 359/604 |
| 2007/0285812 A1* | 12/2007 | Foote | B60R 1/072 |
| | | | 359/877 |
| 2008/0043354 A1* | 2/2008 | Fukai | B60R 1/072 |
| | | | 359/877 |
| 2009/0040306 A1 | 2/2009 | Foote et al. | |
| 2009/0161379 A1 | 6/2009 | Liesener | |
| 2009/0251785 A1* | 10/2009 | Bruhnke | B60R 1/04 |
| | | | 359/604 |
| 2009/0251913 A1 | 10/2009 | Bruhnke et al. | |
| 2010/0067131 A1 | 3/2010 | Negel | |
| 2010/0182143 A1 | 7/2010 | Lynam | |
| 2010/0238570 A1 | 9/2010 | Reedman et al. | |
| 2010/0321758 A1 | 12/2010 | Bugno et al. | |
| 2011/0194203 A1 | 8/2011 | Foote et al. | |
| 2012/0038964 A1 | 2/2012 | De Wind et al. | |
| 2012/0236388 A1 | 9/2012 | De Wind et al. | |
| 2014/0022390 A1 | 1/2014 | Blank et al. | |
| 2014/0285666 A1 | 9/2014 | O'Connell et al. | |
| 2015/0097955 A1 | 4/2015 | De Wind et al. | |
| 2015/0224930 A1 | 8/2015 | Foote et al. | |
| 2019/0039522 A1 | 2/2019 | Foote et al. | |
| 2019/0243492 A1 | 8/2019 | Uken et al. | |

FOREIGN PATENT DOCUMENTS

| | | |
|---|---|---|
| DE | 1755577 B1 | 5/1972 |
| DE | 4141657 A1 | 7/1992 |
| DE | 19538770 A1 | 4/1997 |
| DE | 19601429 C1 | 4/1997 |
| DE | 102008026039 A1 | 12/2009 |
| DE | 202010005203 U1 | 9/2010 |
| DE | 102009031809 A1 | 1/2011 |
| EP | 0064421 A1 | 11/1982 |
| EP | 0314839 A1 | 5/1989 |
| EP | 0780266 A2 | 6/1997 |
| EP | 1000807 A2 | 5/2000 |
| EP | 1188616 A2 | 3/2002 |
| EP | 1300289 A2 | 4/2003 |
| EP | 1755923 A1 | 2/2007 |
| EP | 2017127 A1 | 1/2009 |
| EP | 2112022 A1 | 10/2009 |
| EP | 2165886 A1 | 3/2010 |
| EP | 2492144 A1 | 8/2012 |
| EP | 2492145 A1 | 8/2012 |
| EP | 3321132 A1 | 5/2018 |
| FR | 2503647 A1 | 10/1982 |
| FR | 2605567 A1 | 4/1988 |
| GB | 2197829 A | 6/1988 |
| GB | 2244965 A | 12/1991 |
| WO | 2010124064 A1 | 10/2010 |
| WO | 2011/044312 A1 | 4/2011 |
| WO | 2013/071070 A1 | 5/2013 |
| WO | 2013/126719 A2 | 8/2013 |

OTHER PUBLICATIONS

IPR Proceeding No. IPR2020-00777, filed Mar. 31, 2020, re U.S. Pat. No. 10,261,648.

UN Regulation No. 46, Revision 3, "Uniform provisions concerning the approval of devices for indirect vision and of motor vehicles with regard to the installation of these devices." (Year 2009).

* cited by examiner

EXTERIOR REARVIEW MIRROR ASSEMBLY

CROSS REFERENCE TO RELATED APPLICATIONS

The present application is a continuation of U.S. patent application Ser. No. 14/618,159, filed Feb. 10, 2015, now U.S. Pat. No. 10,099,618, which claims the filing benefits of U.S. provisional applications, Ser. No. 62/049,641, filed Sep. 12, 2014, and Ser. No. 61/938,843, filed Feb. 12, 2014, which are hereby incorporated herein by reference in their entireties. The present application is also a continuation-in-part of U.S. patent application Ser. No. 15/978,425, filed May 14, 2018, now U.S. Pat. No. 10,913,395, which is a continuation of U.S. patent application Ser. No. 15/822,630, filed Nov. 27, 2017, now U.S. Pat. No. 9,969,334, which is a continuation of U.S. patent application Ser. No. 14/380,464, filed Aug. 22, 2014, now U.S. Pat. No. 9,827,913, which is a 371 national phase filing of PCT Application No. PCT/US2013/027346, filed Feb. 22, 2013, which claims the filing benefits of U.S. provisional applications, Ser. No. 61/758,536, filed Jan. 30, 2013, Ser. No. 61/739,986, filed Dec. 20, 2012, Ser. No. 61/705,876, filed Sep. 26, 2012, Ser. No. 61/697,554, filed Sep. 6, 2012, Ser. No. 61/665,509, filed Jun. 28, 2012, Ser. No. 61/664,438, filed Jun. 26, 2012, Ser. No. 61/647,179, filed May 15, 2012, Ser. No. 61/614,877, filed Mar. 23, 2012, and Ser. No. 61/601,756, filed Feb. 22, 2012. U.S. patent application Ser. No. 14/380,464 is also a continuation-in-part of U.S. patent application Ser. No. 14/357,025, filed May 8, 2014, now U.S. Pat. No. 9,346,403, which is a 371 national stage filing of PCT Application No. PCT/US2012/064398, filed Nov. 9, 2012, which claims priority of U.S. provisional applications, Ser. No. 61/705,876, filed Sep. 26, 2012, Ser. No. 61/697,554, filed Sep. 6, 2012, Ser. No. 61/665,509, filed Jun. 28, 2012, Ser. No. 61/664,438, filed Jun. 26, 2012, Ser. No. 61/647,179, filed May 15, 2012, Ser. No. 61/614,877, filed Mar. 23, 2012, Ser. No. 61/601,756, filed Feb. 22, 2012, Ser. No. 61/590,578, filed Jan. 25, 2012, Ser. No. 61/565,541, filed Dec. 1, 2011, and/or Ser. No. 61/558,623, filed Nov. 11, 2011. U.S. patent application Ser. No. 14/380,464 is also a continuation-in-part of U.S. patent application Ser. No. 13/023,747, filed Feb. 9, 2011, now U.S. Pat. No. 8,915,601, which claims priority of U.S. provisional application Ser. No. 61/303,042, filed Feb. 10, 2010.

FIELD OF THE INVENTION

The present invention relates generally to the field of rearview mirror assemblies for vehicles and, more particularly, to an exterior rearview mirror assembly that is operable to adjust a rearward field of view of the driver of the vehicle.

BACKGROUND OF THE INVENTION

Typically, an exterior rearview mirror assembly includes a mirror actuator that is operable to adjust a mirror reflective element relative to the mirror casing so as to adjust a rearward field of view of the driver of the vehicle. The reflective element and actuator are disposed in the mirror casing and the actuator adjusts the reflective element relative to the mirror casing. Powerfold exterior mirror assemblies include an actuator that pivots or folds the mirror casing relative to the side of the vehicle.

SUMMARY OF THE INVENTION

The present invention provides an exterior rearview mirror assembly configured for mounting at an exterior portion of a vehicle. The exterior rearview mirror assembly includes two actuators that are operable to pivot and adjust the mirror head relative to the side of the vehicle so as to provide a mirror reflective element adjustment to adjust the rearward field of view of the driver of the vehicle and to provide a powerfold adjustment to move the mirror head relative to the side of the vehicle.

According to an aspect of the present invention, an exterior rearview mirror assembly includes a base configured for attachment at an exterior portion of a vehicle and a mirror head attached at the base and pivotable relative to the base. The mirror head includes a mirror reflective element that is attached at an attaching plate that is pivotally received or partially received in the mirror head and that is adjustable relative to the mirror head to adjust the rearward field of view of the driver of the vehicle. The mirror reflective element is disposed outboard of the mirror head and a shroud extends from behind the mirror reflective element and is at least partially received in the mirror head and spans a gap between the mirror reflective element and the mirror head.

These and other objects, advantages, purposes and features of the present invention will become apparent upon review of the following specification in conjunction with the drawings.

DESCRIPTION OF THE PREFERRED EMBODIMENTS

Figure 1:
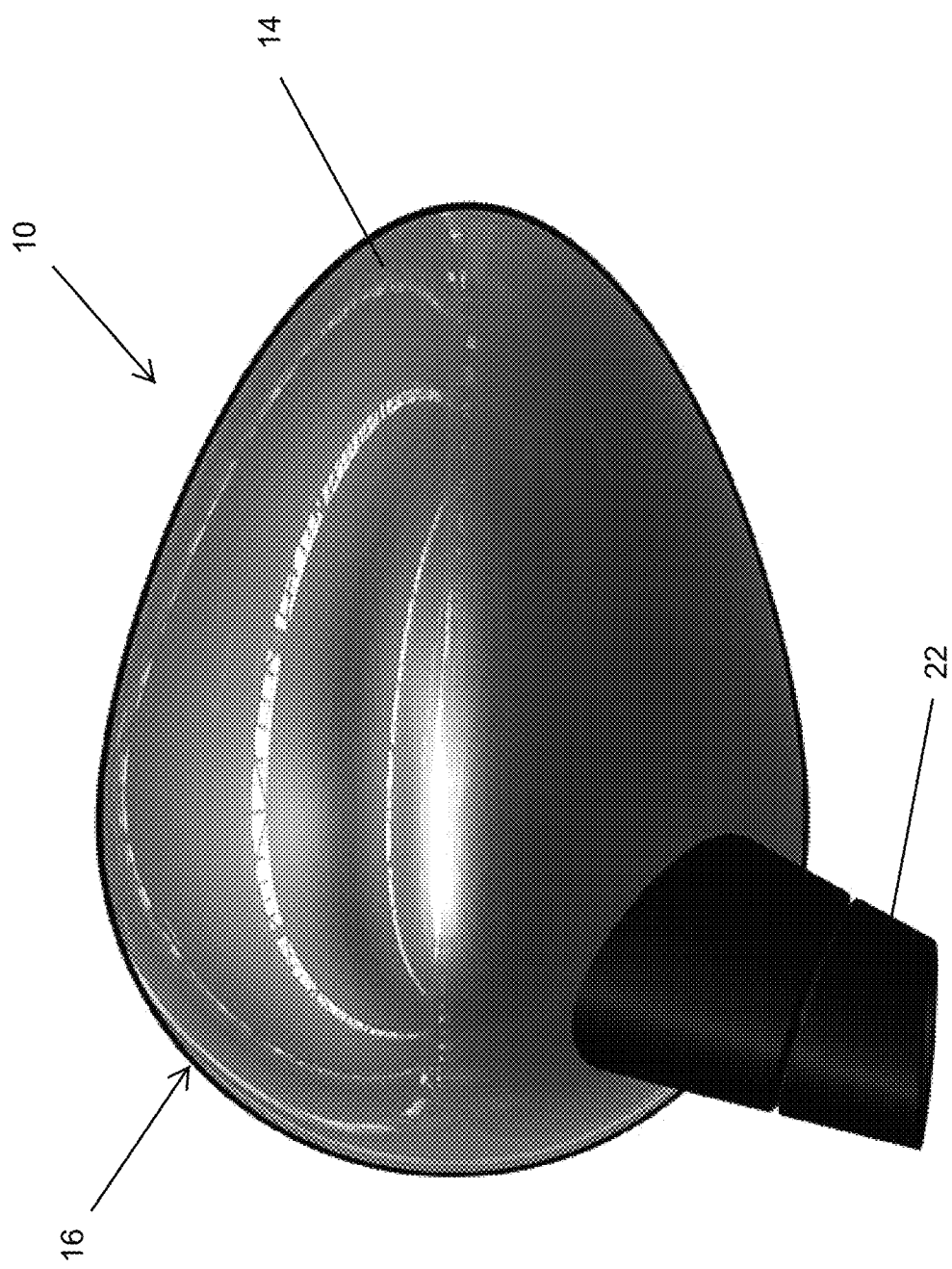
FIGS. 1-5 are perspective views of an exterior rearview mirror assembly in accordance with the present invention.
Figure 2:
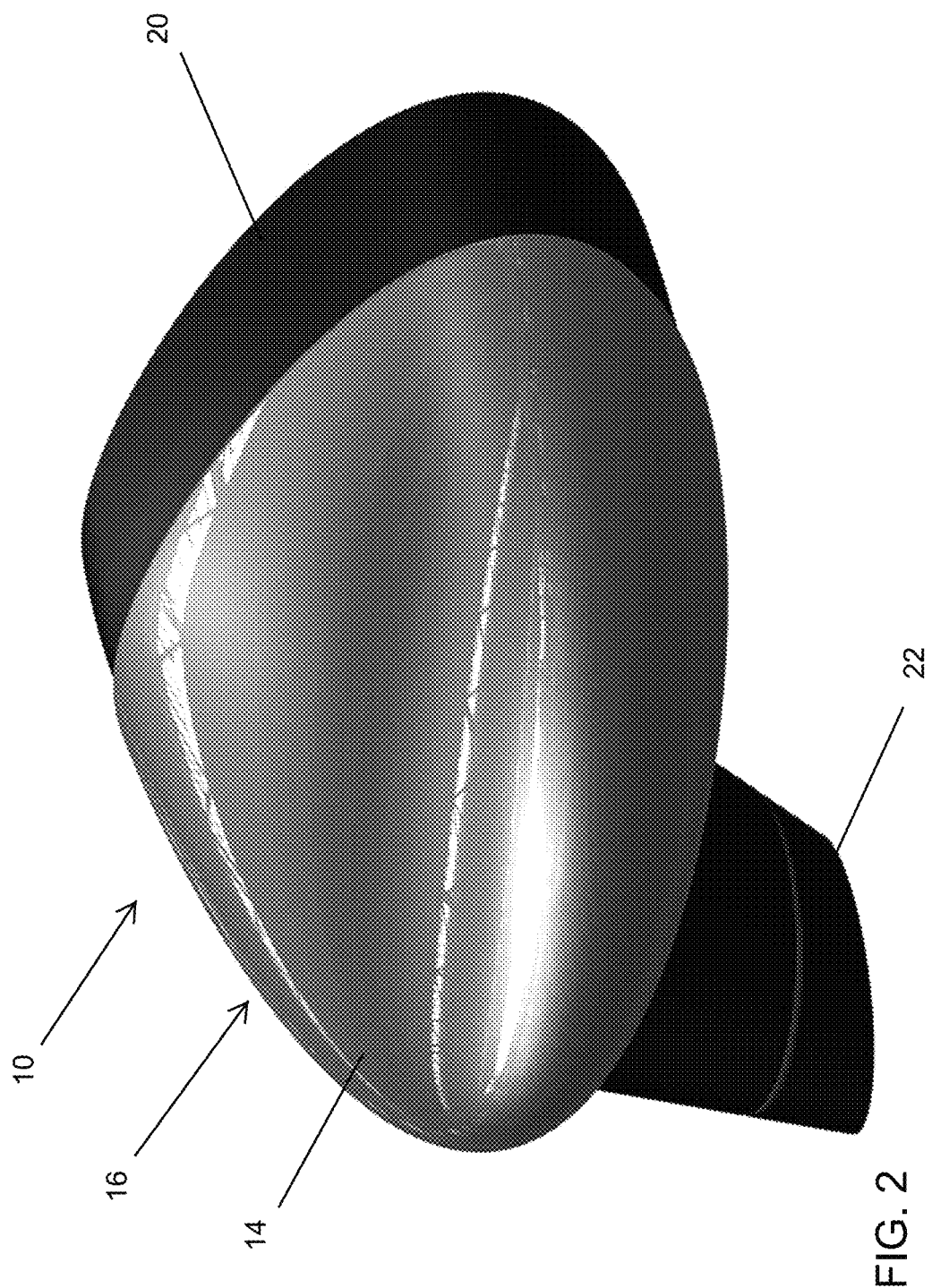
Figure 3:
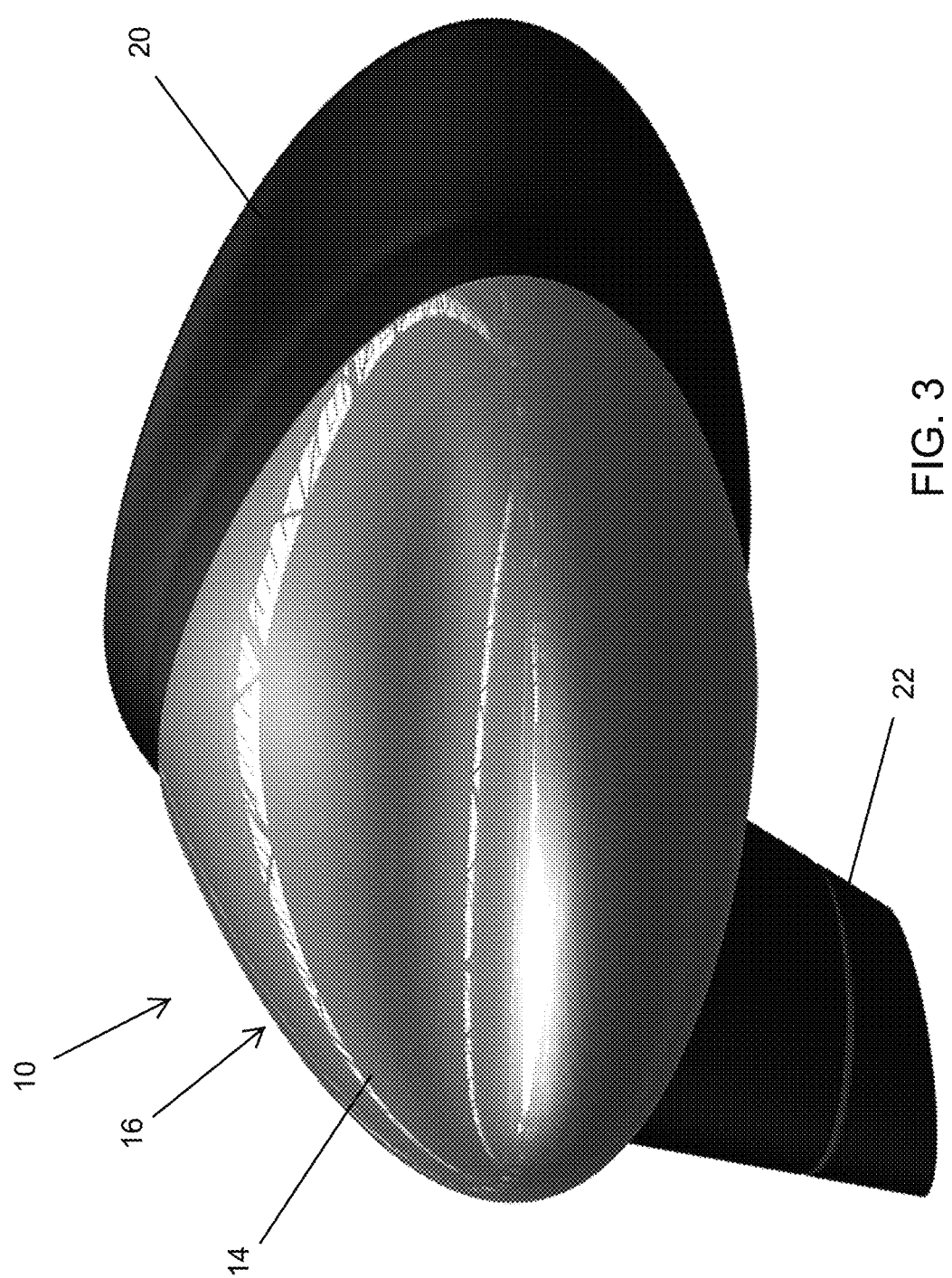
Figure 4:
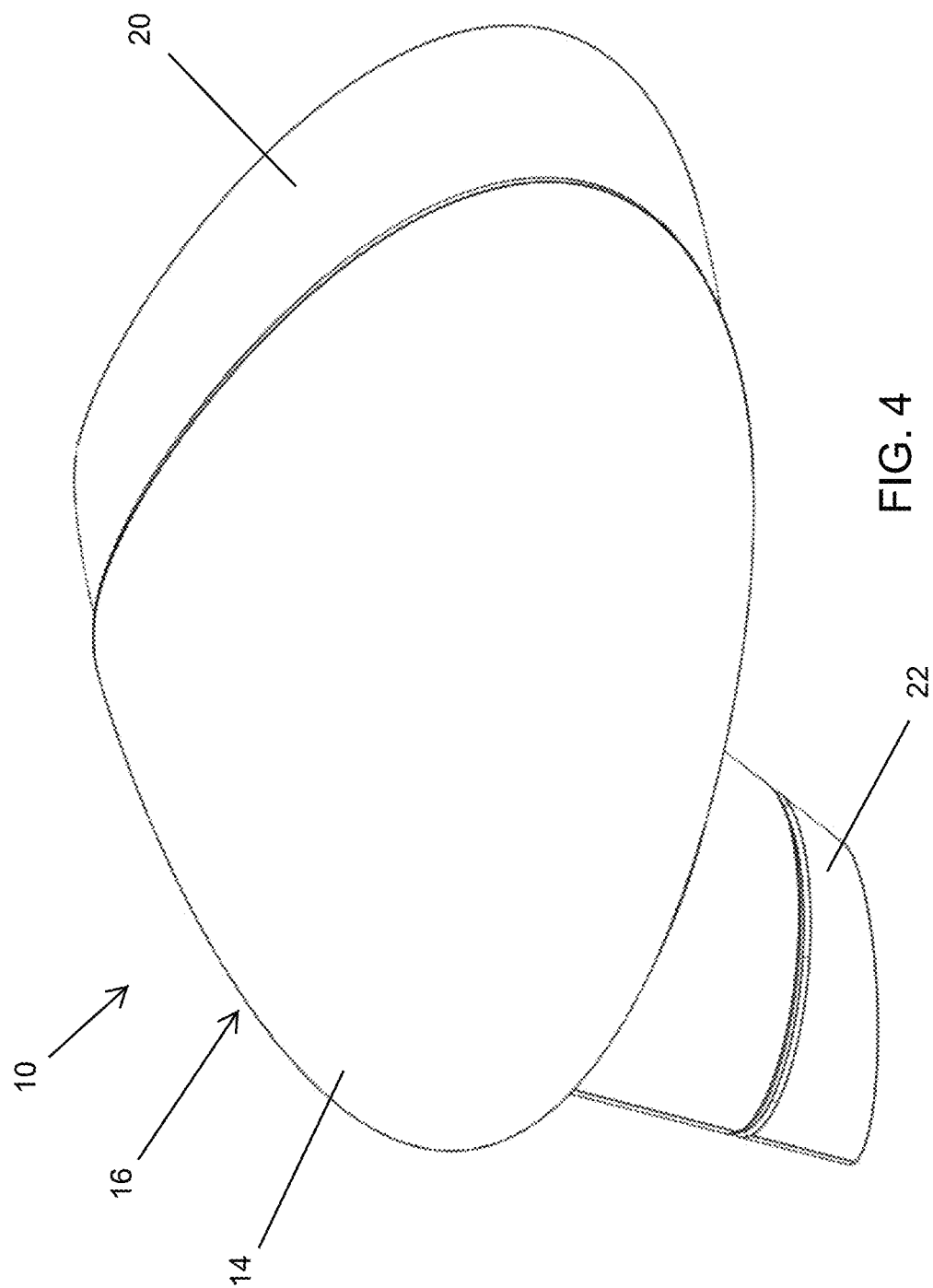
Figure 5:
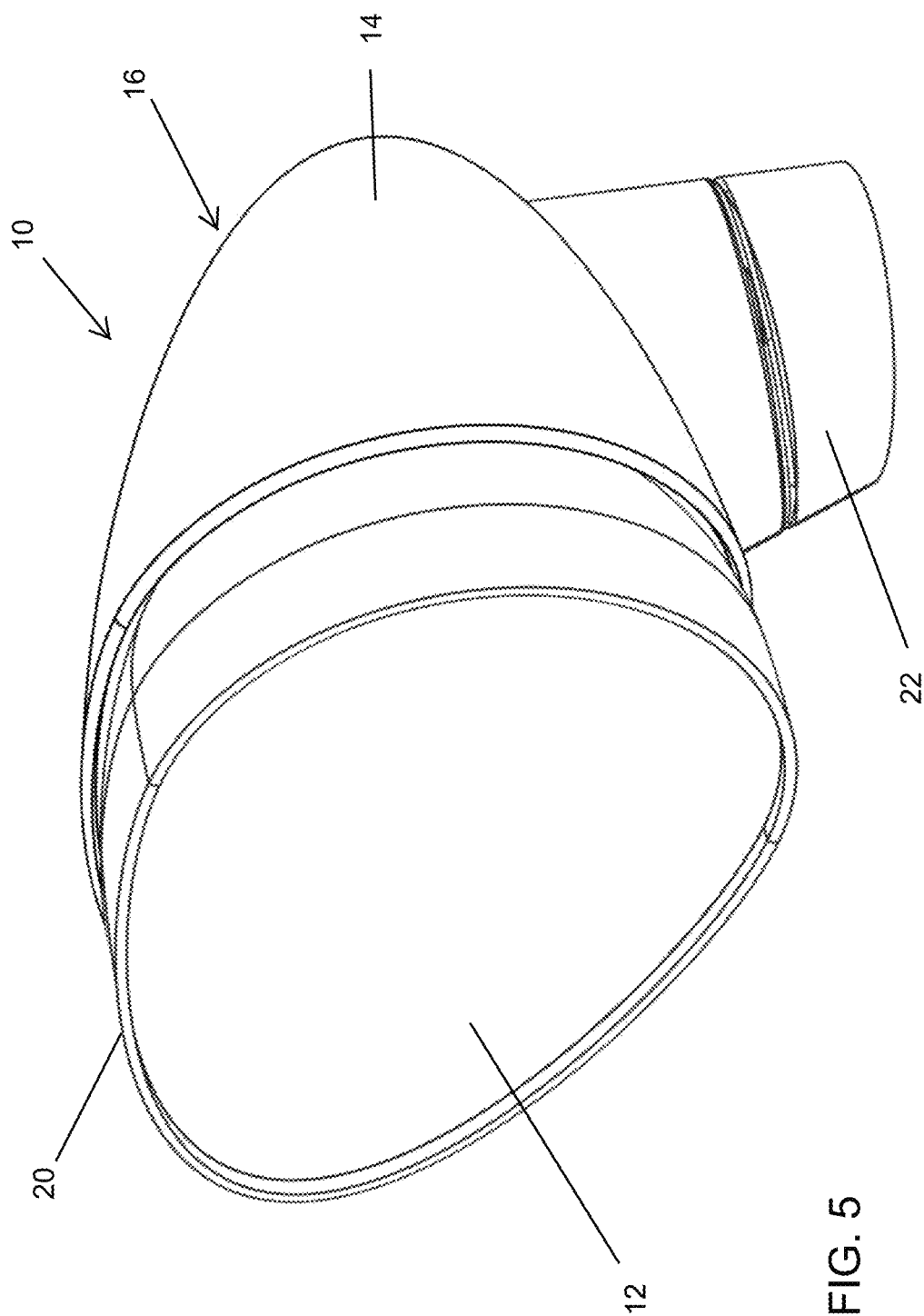

An exterior rearview mirror assembly of the present invention may comprise dual actuators and dual pivot axes for adjusting a mirror head and reflective element relative to a side of a vehicle at which the mirror assembly is mounted. The mirror casing of the exterior rearview mirror assembly of the present invention may be fixedly disposed or attached at a side of a vehicle (or movably disposed thereat and movable to pivot between a use position and a folded position, such as for a breakaway mirror or power folding mirror), and an inner casing or housing, which at least partially encases or encompasses the rear of the reflective element and the backing plate and actuator, is received in the mirror casing and moves with the reflective element and relative to the non-moving mirror casing. The mirror assembly may utilize aspects of the mirror assemblies described in International Publication Nos. WO 2013/126719 and/or WO 2013/071070, which are hereby incorporated herein by reference in their entireties.

Referring now to the drawings and the illustrative embodiments depicted therein, and with reference to FIGS. 1-6, an exterior rearview mirror assembly 10 includes a mirror reflective element 12 and a fixed or outer mirror casing 14 of a mirror head 16, with the mirror reflective element 12 being adjustable (such as via one or more actuators) relative to the mirror casing 14 to adjust the driver's rearward and sideward view at the side of the vehicle. A backing plate or attachment plate 18 is attached at the rear of the mirror reflective element 12 and attaches the mirror reflective element to a mirror actuator, which is electrically operable to adjust the mirror reflective element responsive to a user input in the vehicle. A shroud or inner casing or housing 20 is disposed or established at the perimeter of the reflective element 12 and extends into the mirror casing 14 to at least partially encompass or encase or hide the mirror actuator and other internal components or the like of the rearview mirror assembly that are disposed at or to the rear of the reflective element. As can be seen in FIGS. 1-6, when the mirror reflective element 12 is adjusted relative to the outer casing 14 to adjust the driver's rearward and sideward field of view, the inner casing or shroud 20 is all that is viewable behind the reflective element 12 and functions to hide and conceal and protect the inner components of the reflective element in any and all of its adjustable positions or orientations relative to the mirror casing.

The mirror casing 14 may comprise any suitable casing and may be designed and shaped in a manner selected for a particular vehicle application. The mirror casing is attached at a mounting portion 22, which mounts the mirror head at the side of the vehicle (and may adjustably mount the mirror head at the vehicle to provide a powerfold function or the like). Optionally, the mirror casing may be generally fixedly attached at the mounting portion or the mirror casing may be pivotally attached at the mounting portion, such as to allow for folding of the mirror casing between a use position and a folded or non-use position. Optionally, the mirror assembly may comprise a powerfold mirror assembly, whereby such folding or pivoting of the mirror casing may be achieved via a powered motor or actuator or the like. The reflective element 12 and shroud or flange 20 are movably or adjustably disposed at least partially in the mirror casing and move with the mirror casing when it is moved relative to the side of the vehicle (such as for powerfold and/or breakaway mirror applications).

Figure 6:
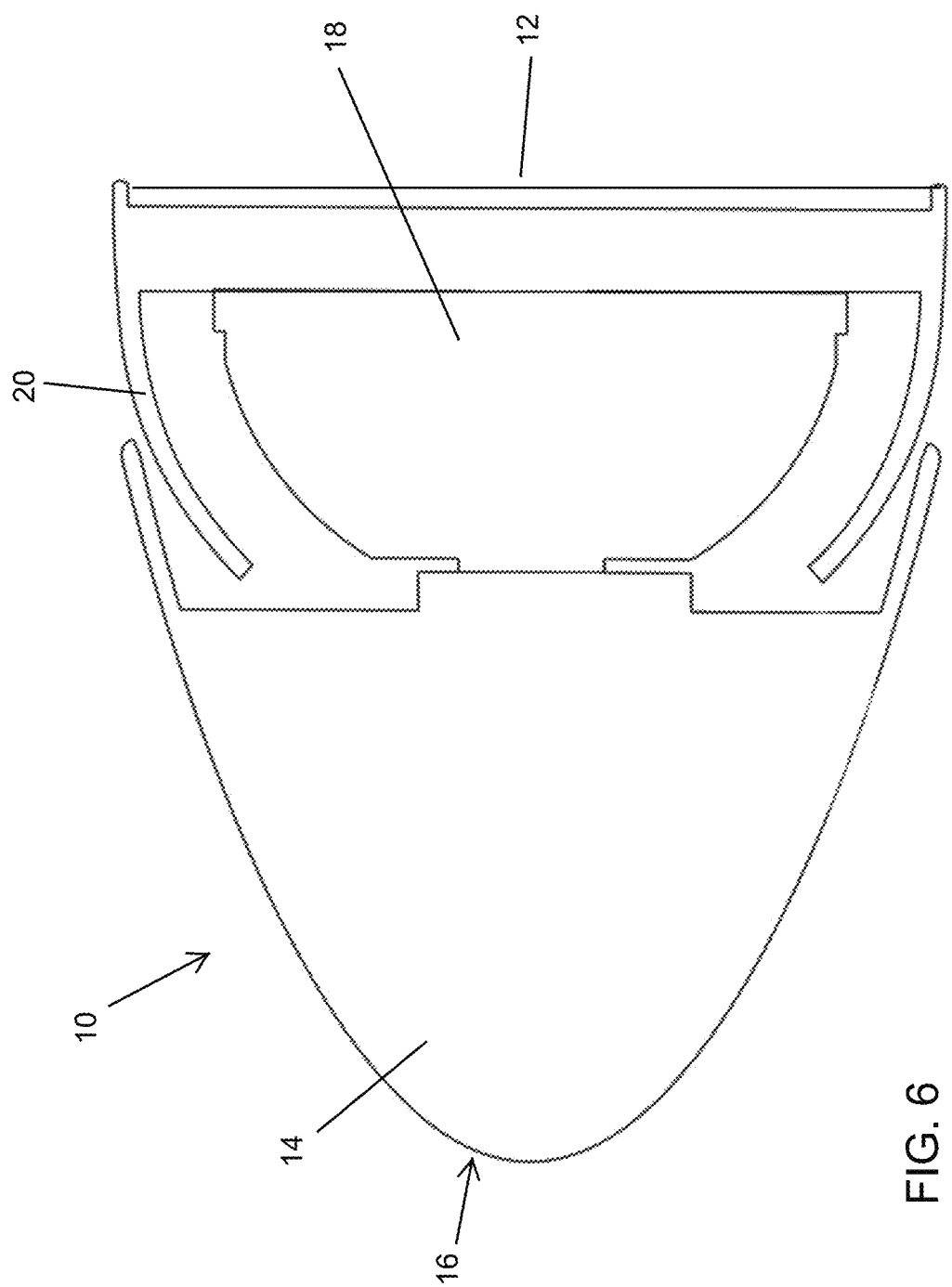
FIG. 6 is a sectional view of another exterior rearview mirror assembly of the present invention.
Figure 7:
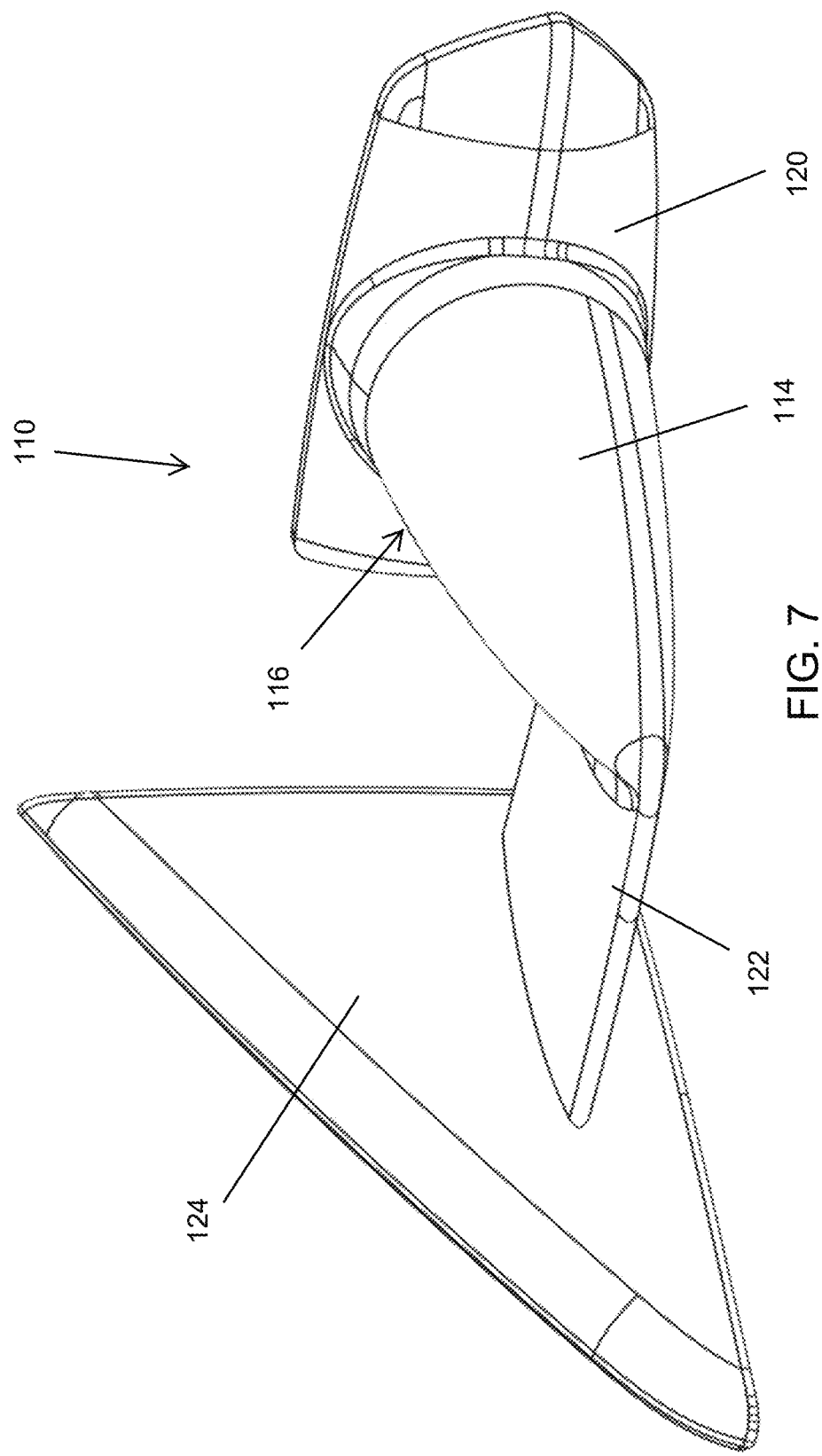
FIGS. 7-12 are perspective views of another exterior rearview mirror assembly in accordance with the present invention.
Figure 8:
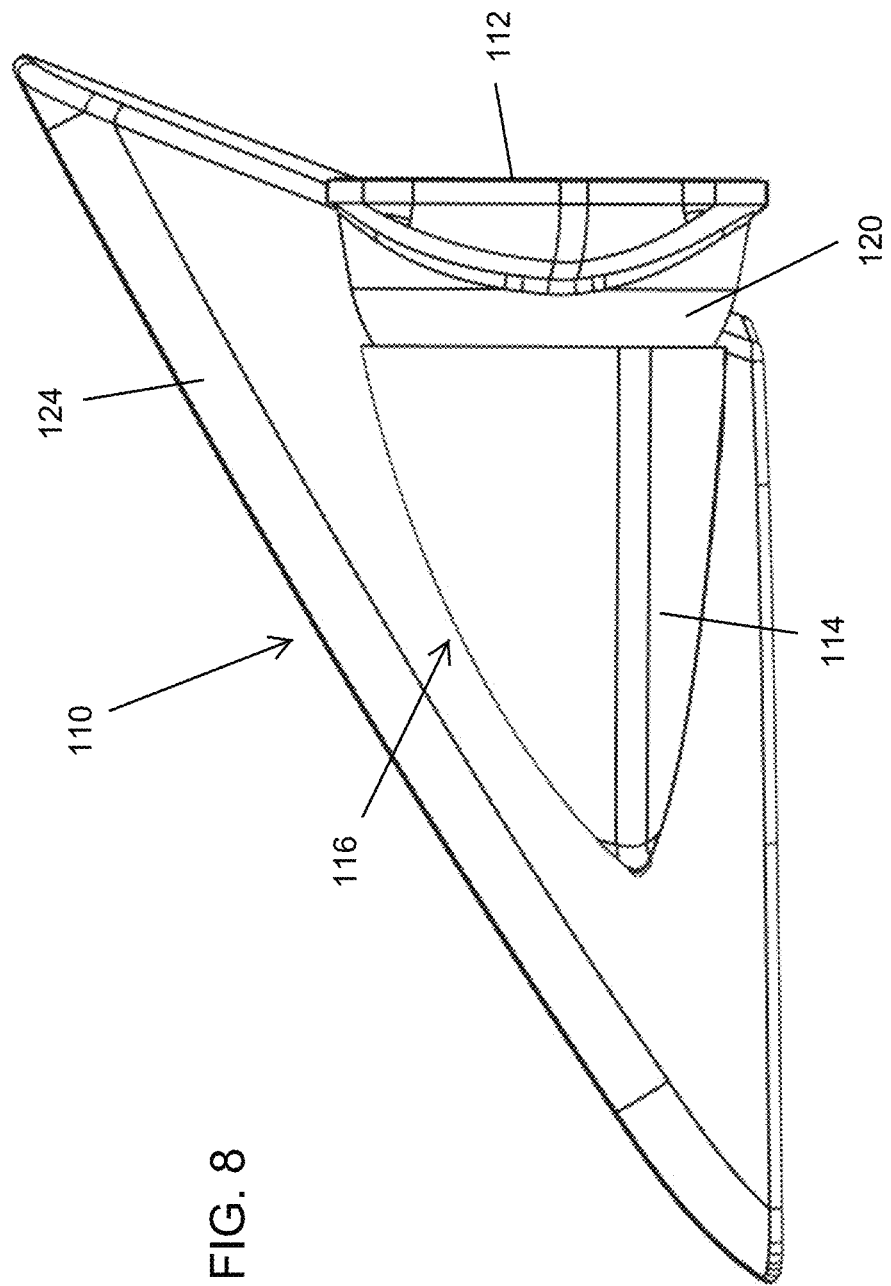
Figure 9:
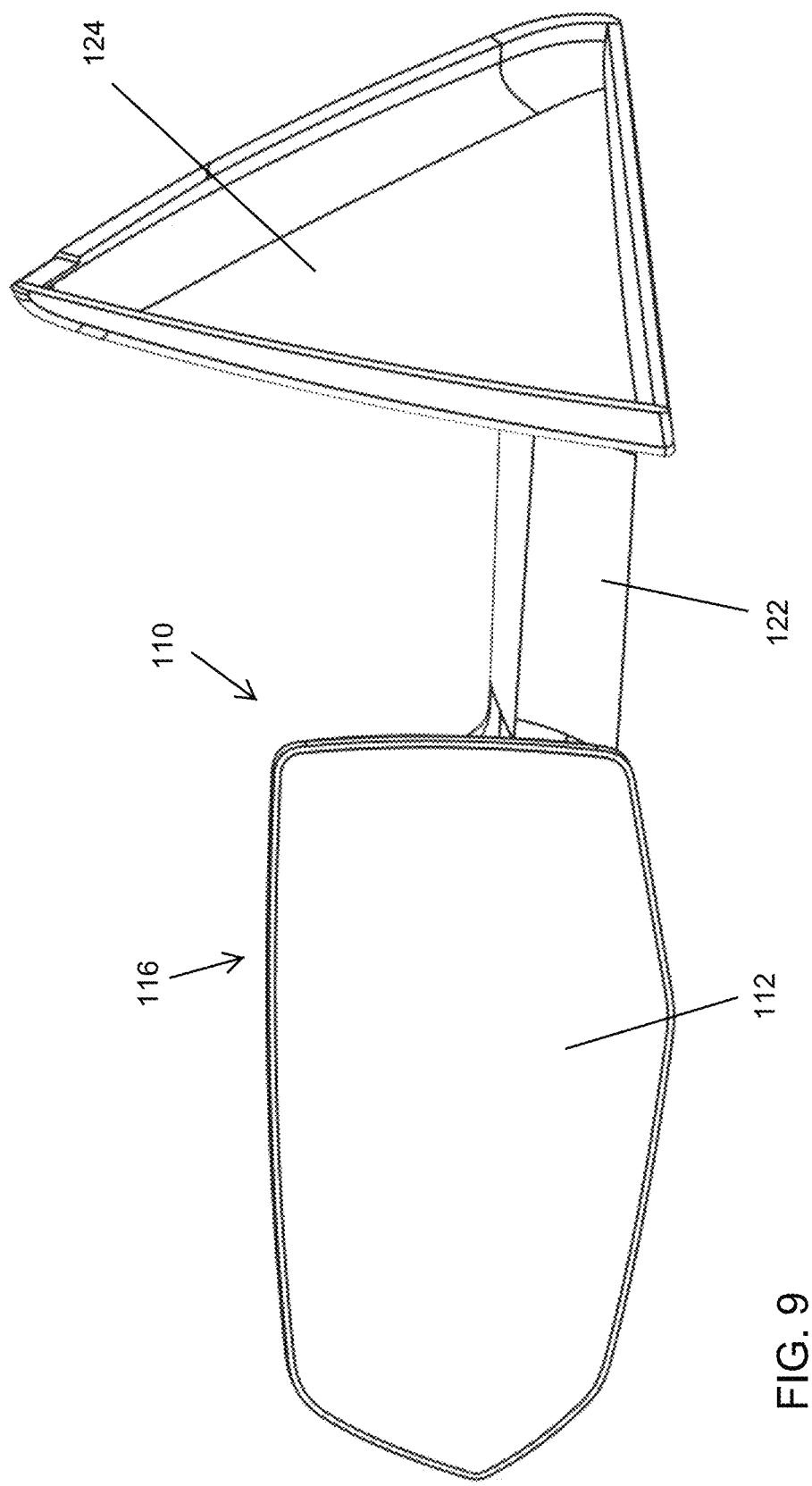
Figure 10:
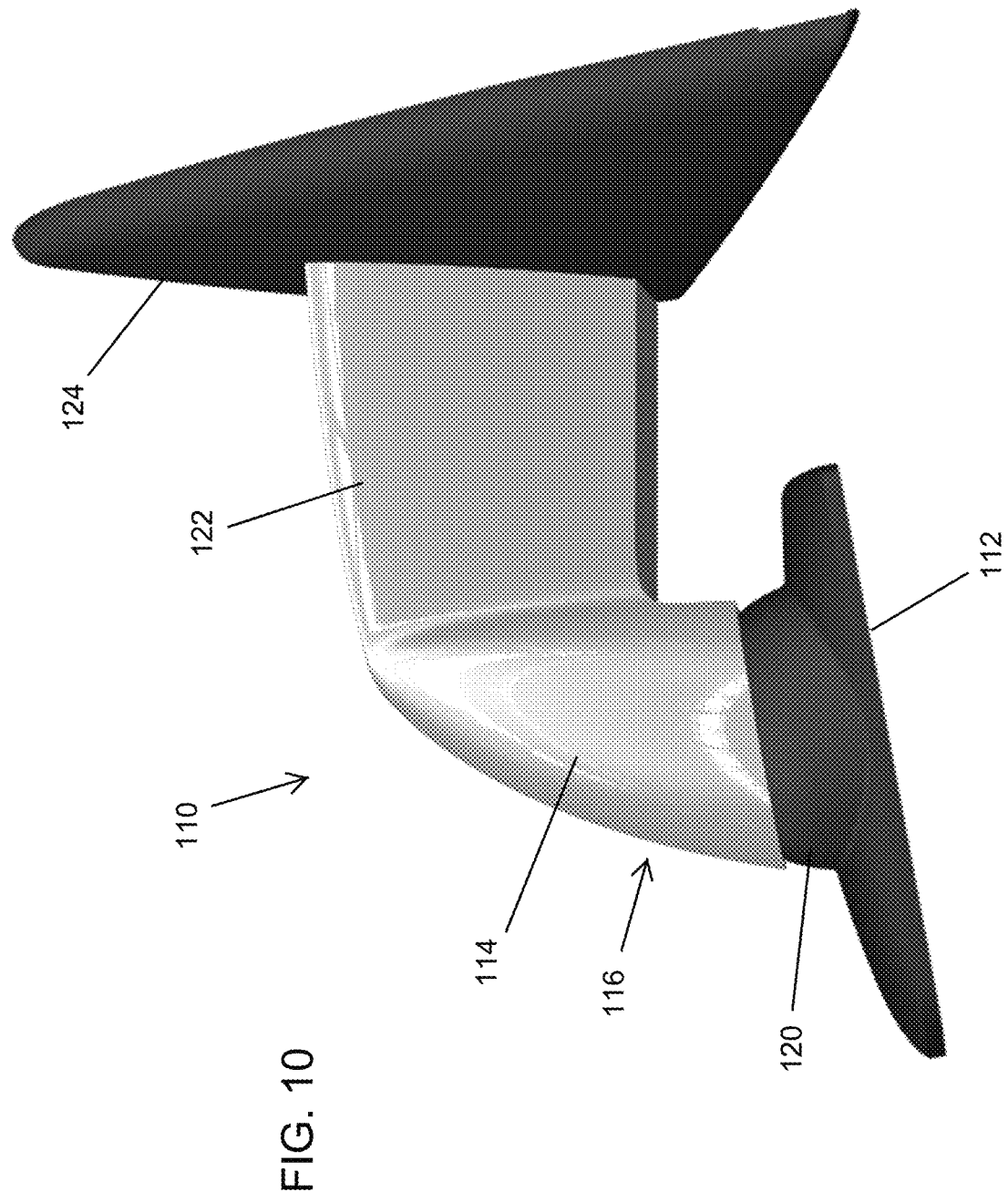
Figure 11:
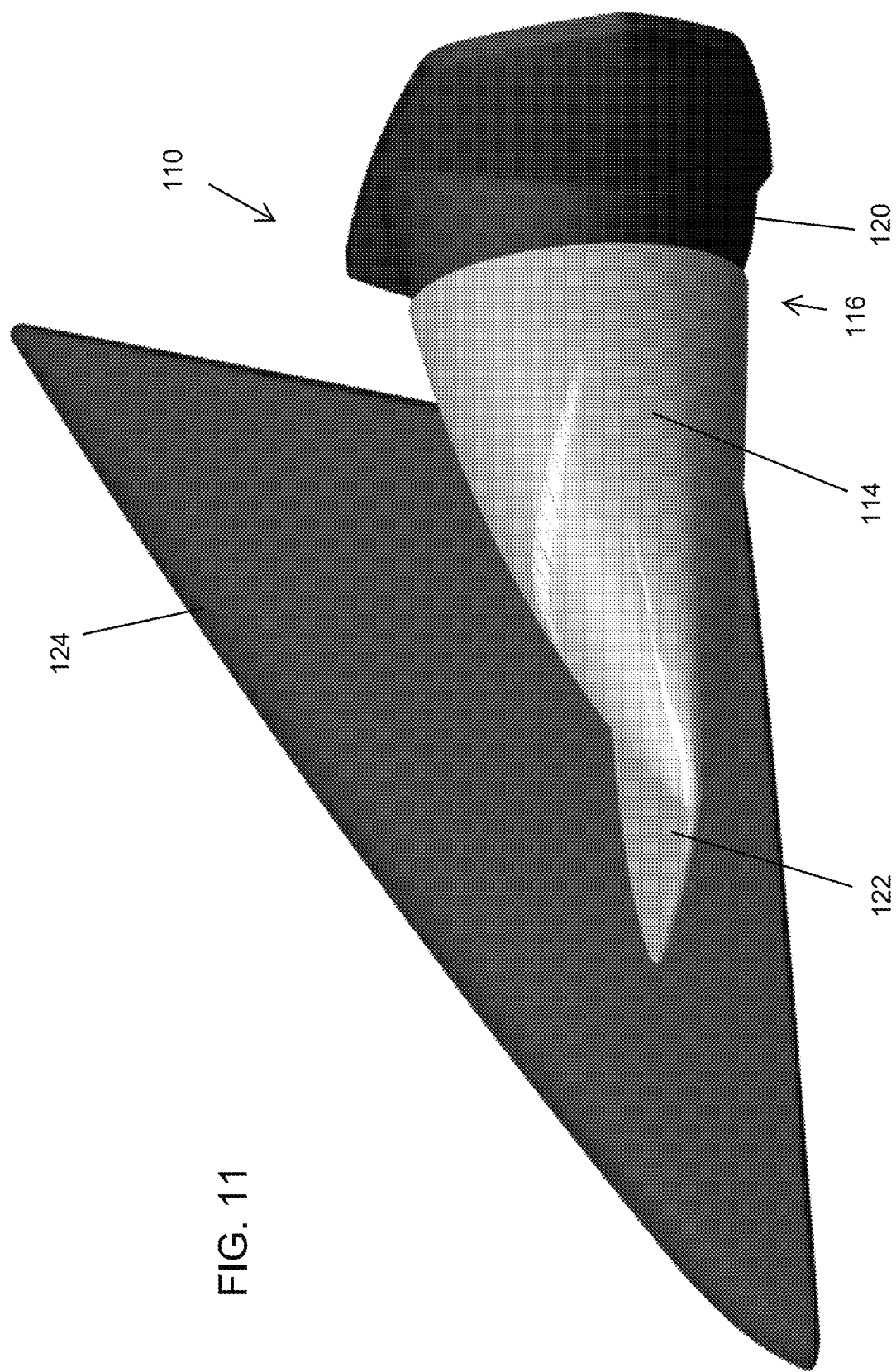
Figure 12:
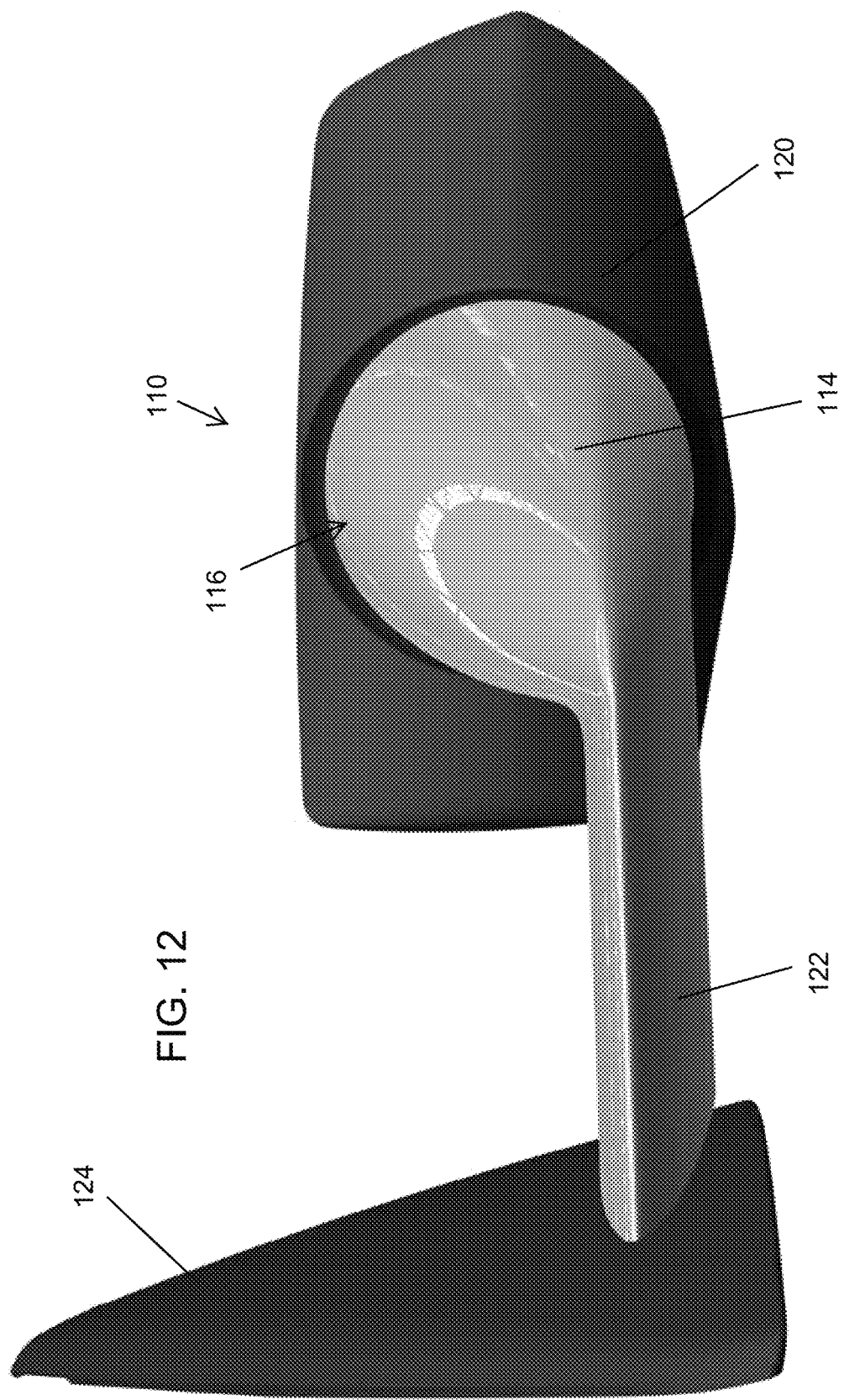
Figure 13:
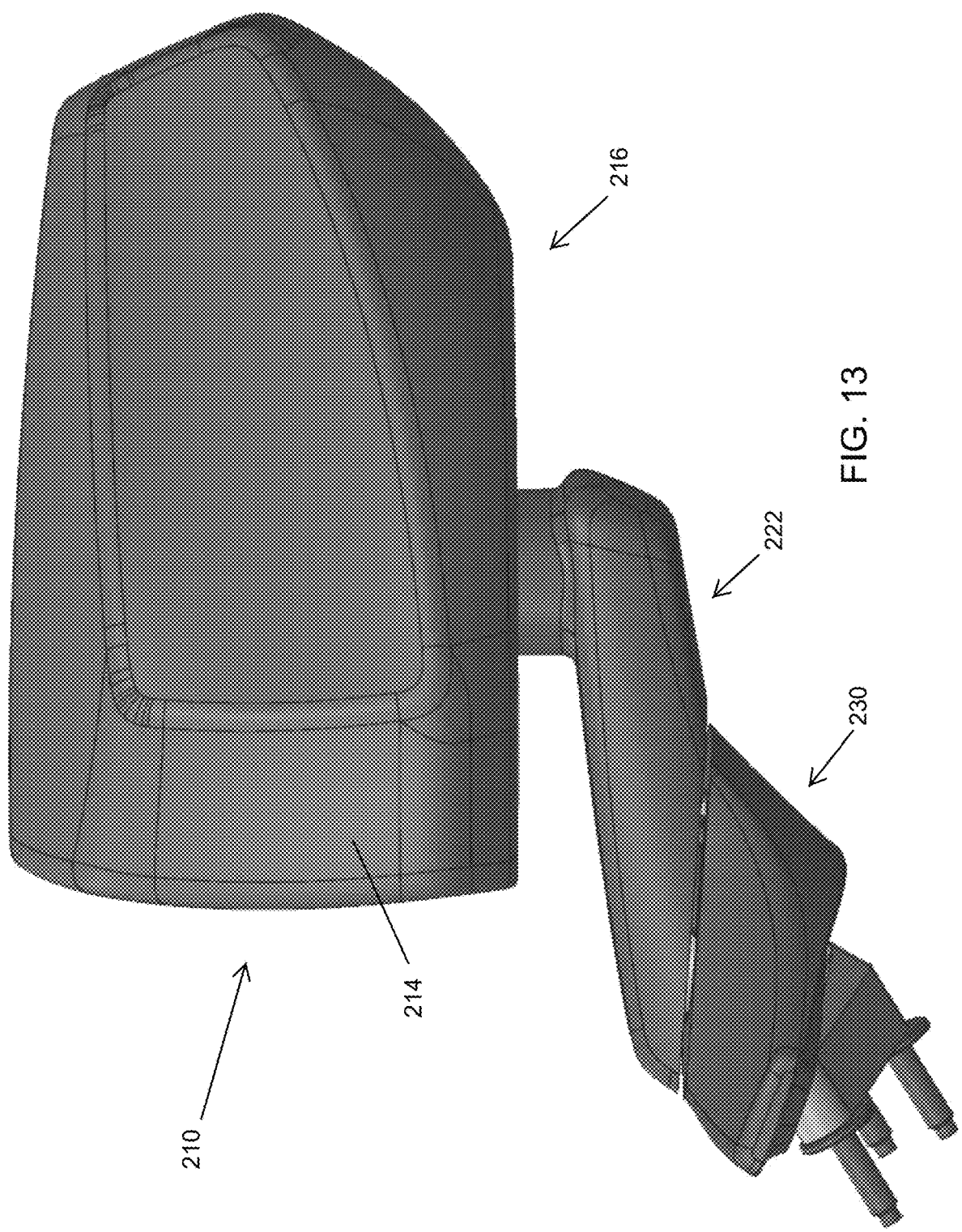
FIG. 13 is a perspective view of another exterior rearview mirror assembly in accordance with the present invention.
Figure 14:
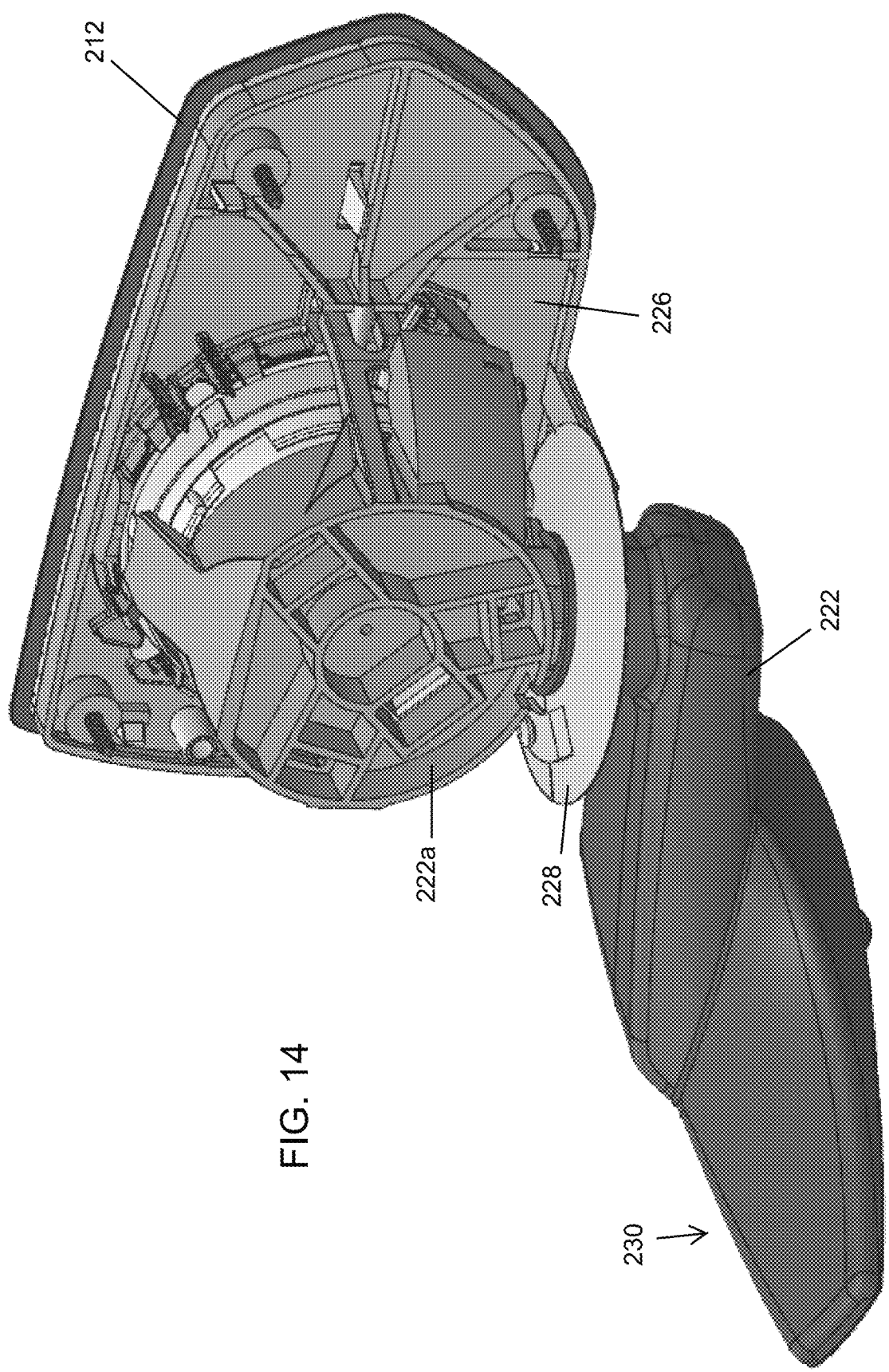
FIG. 14 is another perspective view of the exterior rearview mirror assembly of FIG. 13, with the mirror casing removed to show additional details.
Figure 15:
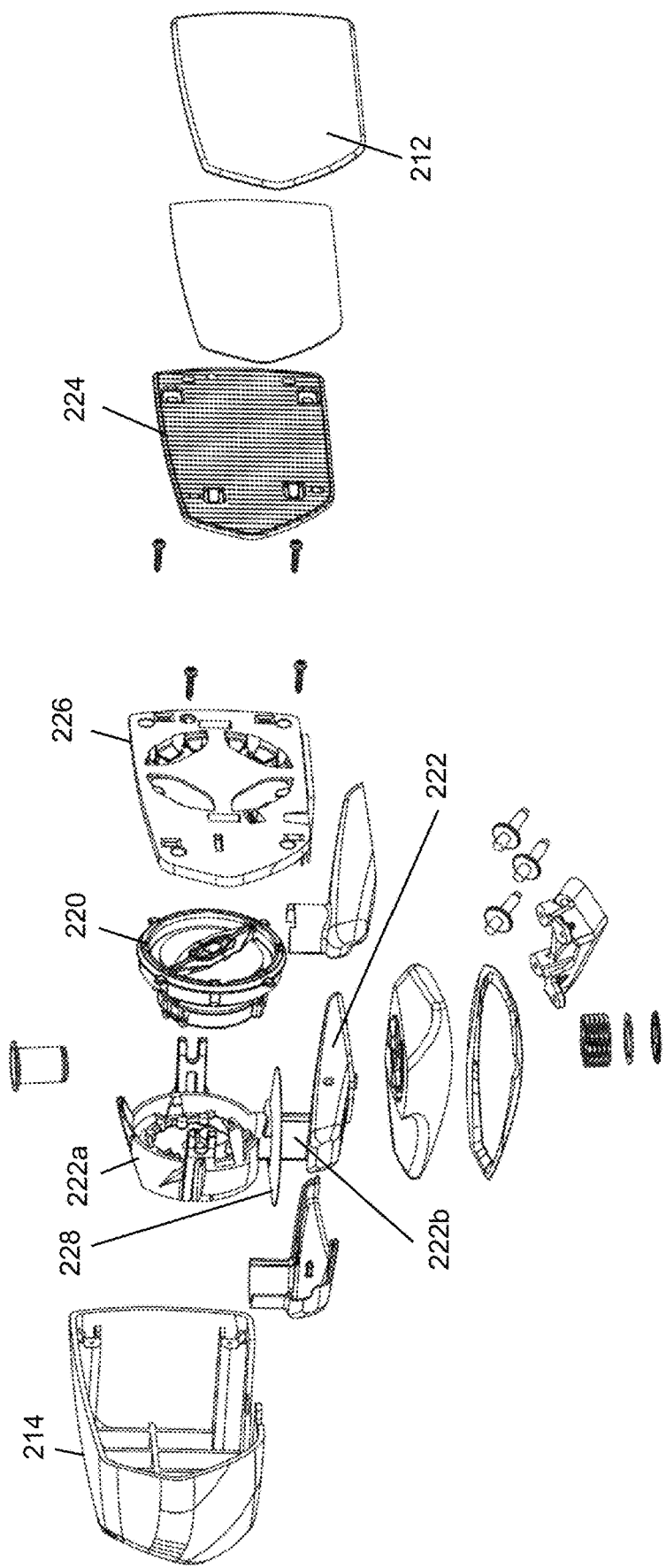
FIG. 15 is an exploded perspective view of the exterior rearview mirror assembly of FIG. 13.
Figure 16:
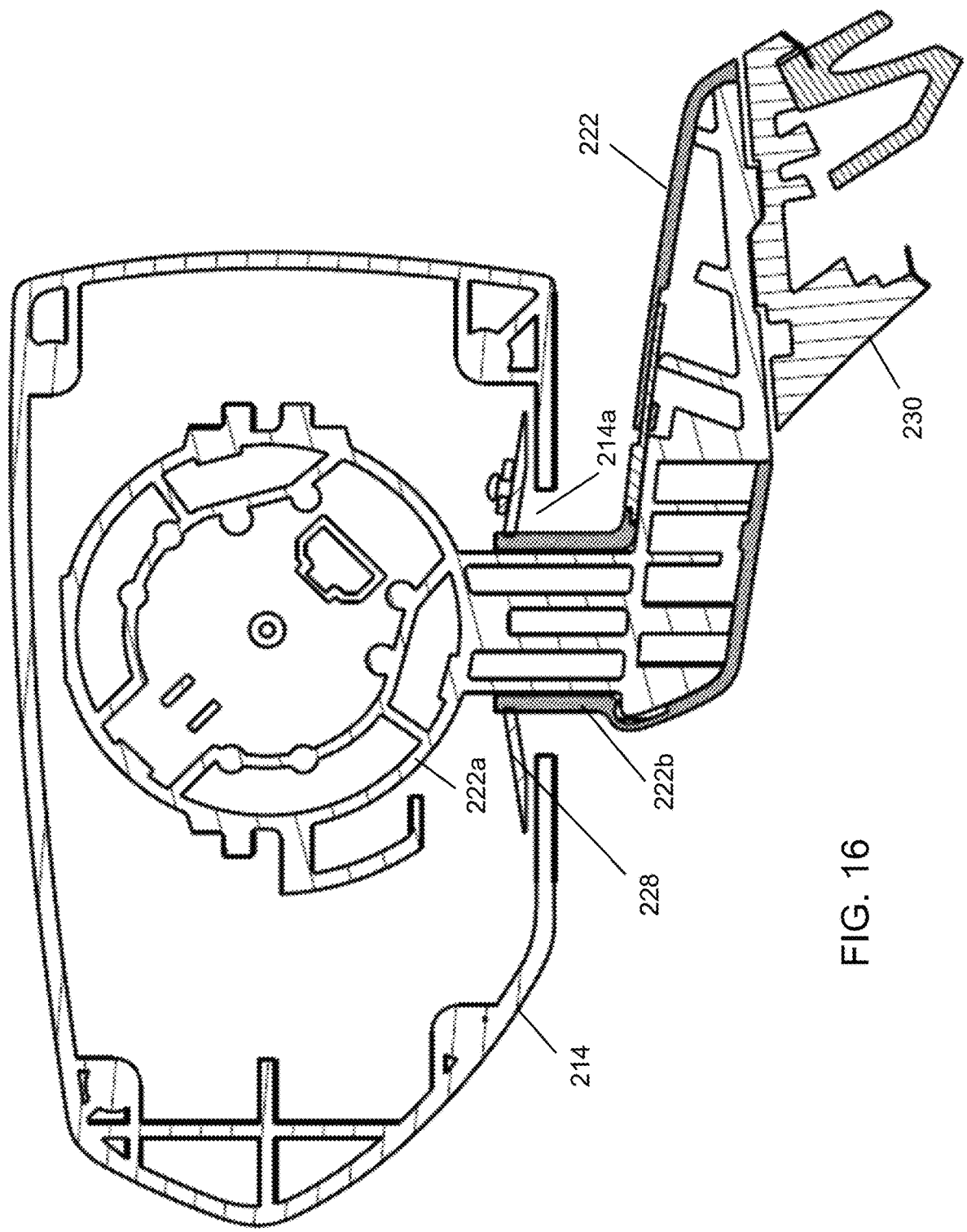
FIG. 16 is a sectional view of the exterior rearview mirror assembly of FIG. 13.
Figure 17:
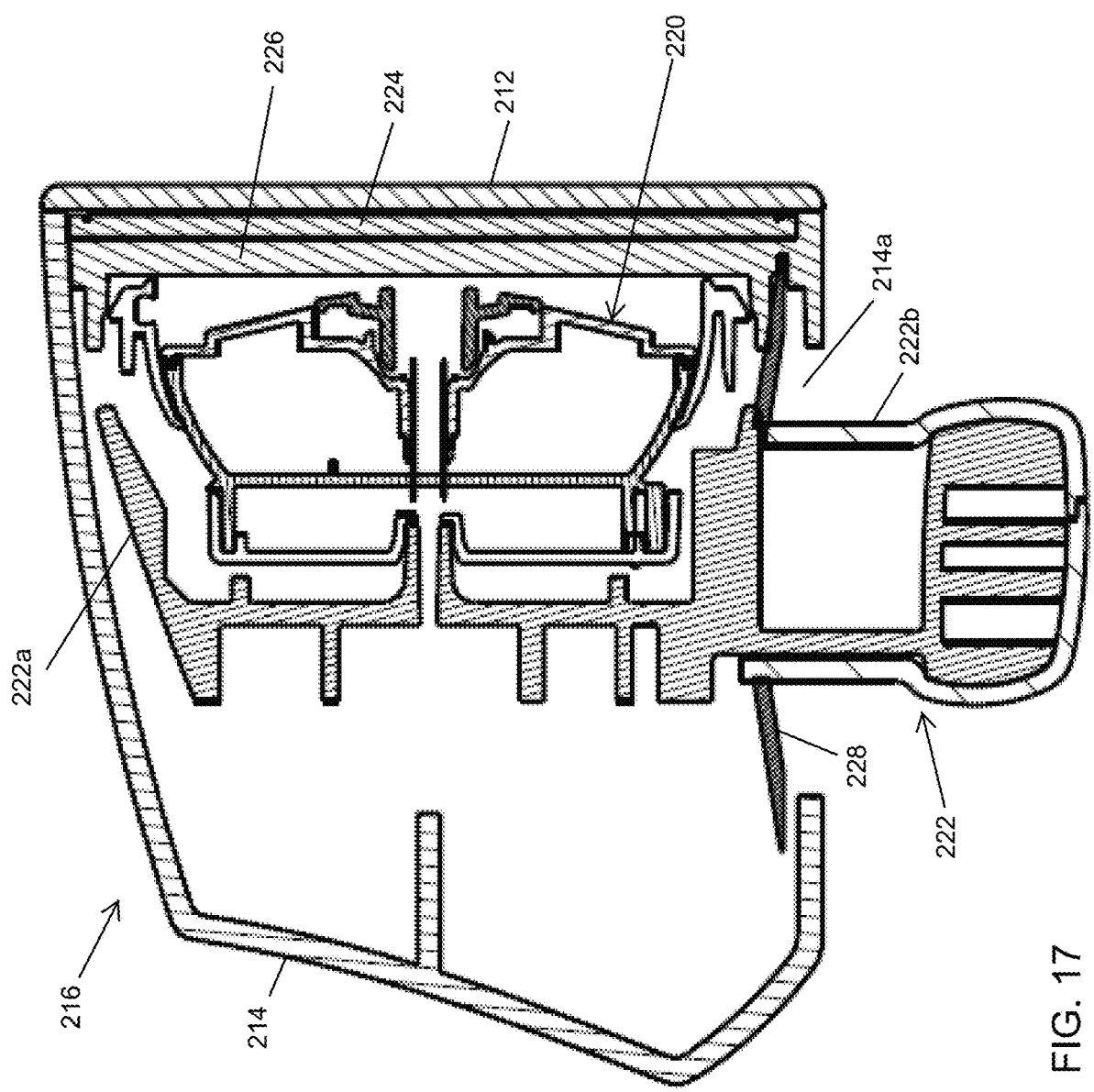
FIG. 17 is another sectional view of the exterior rearview mirror assembly of FIG. 13.
Figure 18:
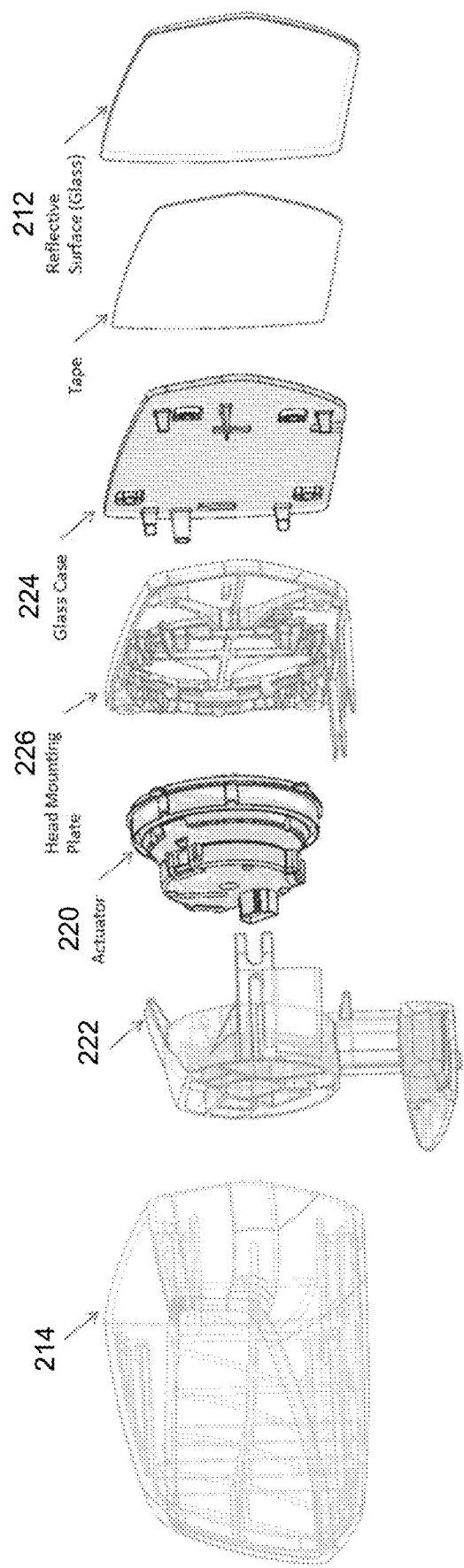
FIG. 18 is another exploded perspective view of the exterior rearview mirror assembly of FIG. 13.
Figure 19:
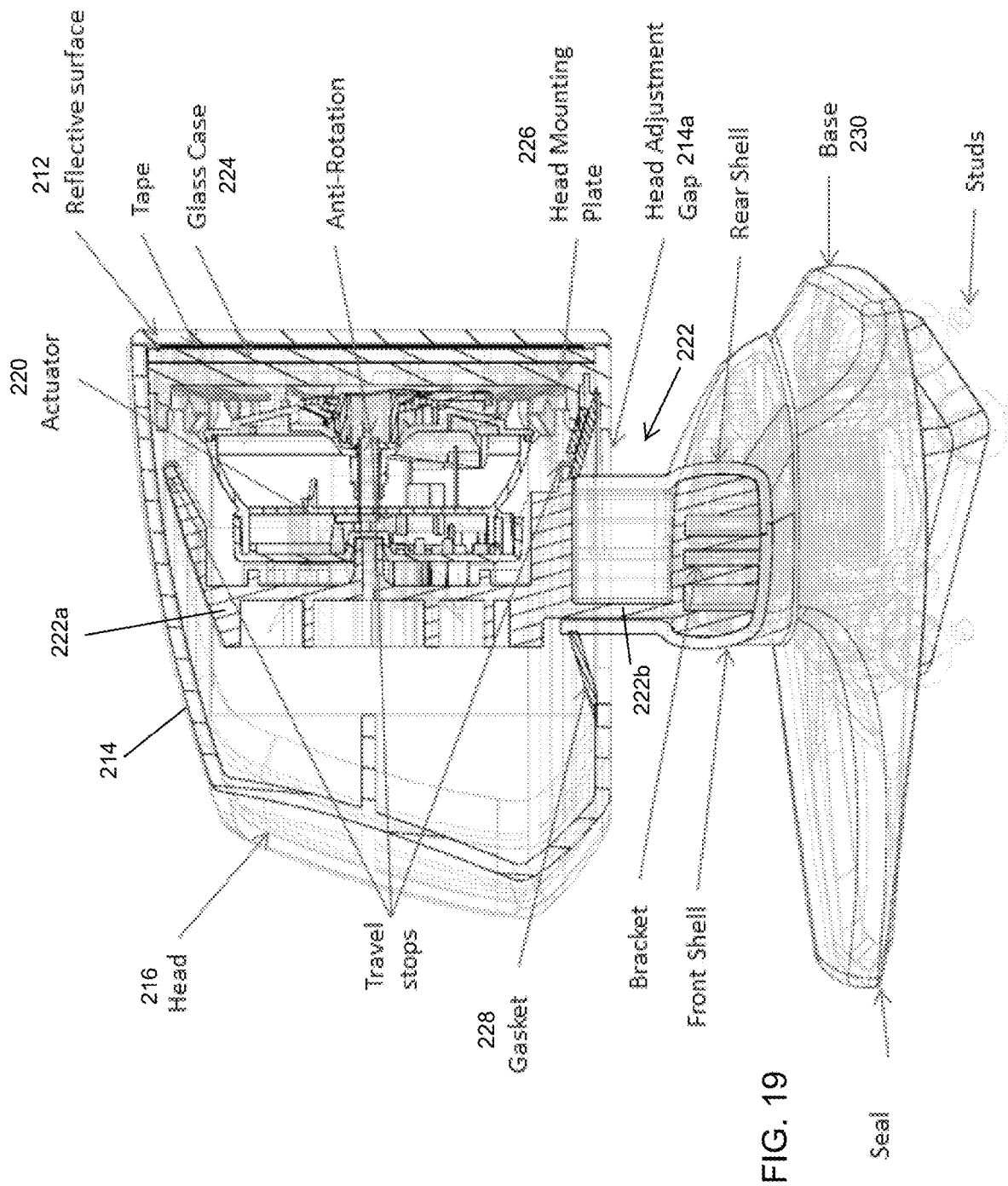
FIG. 19 is another sectional view of the exterior rearview mirror assembly of FIG. 13.
Figure 20:
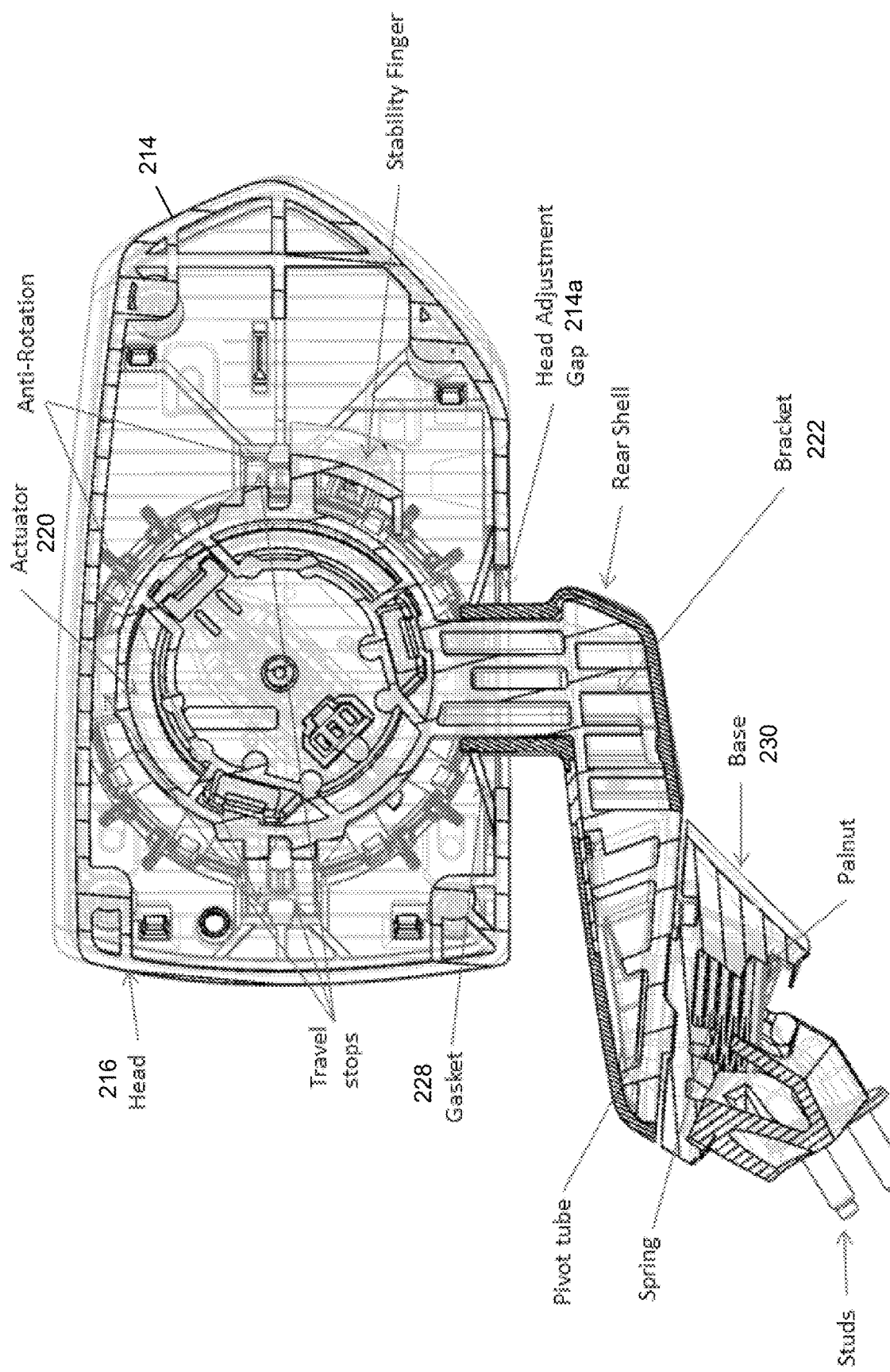
FIG. 20 is another sectional view of the exterior rearview mirror assembly of FIG. 13.

Optionally, the inner casing or shroud or flange may be integrally formed with the back plate (or optionally, the flange or shroud may be attached at the back plate and/or attached at the reflective element or the like) and extends rearward therefrom. In the illustrated embodiment, the shroud 20 curves inward to cover or conceal or at least partially cover or conceal the back plate and mirror actuator and the like at the rear of the reflective element. As can be seen in FIG. 6, the shroud 20 is received in the mirror casing 14 of mirror head 16 and tapers inward to allow for pivotal movement of the mirror reflective element (and back plate and shroud) relative to the mirror casing without interference between the shroud and mirror casing (or optionally with minimal interference where the shroud may slide relative to the inner surface of the mirror casing such as when the mirror reflective element is adjusted by the driver of the vehicle to adjust his or her rearward field of view). When the reflective element is in a neutral or centered orientation (not angled sidewardly or upwardly or downwardly, such as shown in FIG. 6), the reflective element may be disposed outboard of the mirror casing, with the shroud spanning the gap between the reflective element and the mirror casing of the mirror head and being viewable around the perimeter of the open end of the mirror casing of the mirror head and rearward of the reflective element. Thus, the mirror casing size and shape may be reduced and the mirror casing cavity may be sized to receive the shroud 20 therein with little or minimal clearance between an outboard surface of the shroud and an inner surface of the mirror casing at its open end.

Optionally, a lip or flange may be provided around the perimeter edge of the reflective element and may protrude radially outwardly from the outer surface of the shroud that is rearward of the reflective element. When the mirror reflective element is fully tilted or pivoted to either its outboard direction, its inboard direction, upwardly and/or downwardly, the lip at the respective perimeter region of the reflective element may approach or even contact the open end of the mirror casing.

Optionally, the shroud 20 may be open at its inner or rearward end to allow for mounting of the mirror actuator within the mirror casing 14 of the mirror head, or the shroud may be closed so that the mirror reflective element assembly or mirror head may comprise a closed or sealed unit that may be readily mounted in the mirror casing (whereby the actuator may be readily electrically connected to an electrical connector in the mirror casing). When so mounted, the mirror reflective element may be adjusted upward, downward and sideward relative to the mirror casing, while the shroud conceals the back plate and actuator from view.

The exterior rearview mirror assembly thus comprises an exterior rearview mirror assembly having a fixed outer mirror casing or housing, with the reflective element "holder" extending into the casing and having approximately the same height and width as the inner edge of the mirror casing perimeter. The flange or shroud or inner housing is received in or tucks inside the mirror casing to cover or substantially cover and conceal the actuator and to hide the internal components and the like of the mirror assembly. Such an inner housing or shroud configuration allows for enhanced fine tuning of aerodynamic properties of the exterior mirror assembly, because the mirror casing does not move and allows for the size of the mirror casing to be reduced to a reduced size while the mirror assembly still meets minimum vision requirements. The actuator may operate to adjust the mirror reflective element in any suitable manner (such as in a manner similar to that of conventional exterior mirror actuators), but with the reflective element being disposed outboard of the open end of the mirror casing and with the shroud being exposed at the rear of the mirror reflective element (and between the reflective element and the mirror casing) and hiding the actuator and other components disposed behind the reflective element.

Optionally, the exterior rearview mirror assembly may comprise a frameless outside mirror reflective element that provides for adjustment of the mirror reflective element via use of a single actuator located in the head of the mirror. The actuator may combine the functions of the glass and power fold actuators. For example, and with reference to FIGS. 7-12, an exterior rearview mirror assembly 110 includes a mirror reflective element 112 attached at an attaching surface or portion 120 that is adjustably received at or disposed in a mirror casing 114 of a mirror head 116, with the mirror head mounted at a mirror base or arm 122 and with the reflective element and attaching portion being movable or adjustable relative to the mirror head via an actuator, such as in a similar manner as described above and/or such as by utilizing aspects of the mirror assemblies described in International Publication Nos. WO 2013/126719 and/or WO 2013/071070, which are hereby incorporated herein by reference in their entireties.

In the illustrated embodiment, the mirror head 116 includes a cover element or mirror cover or casing 114 that is attached at the mounting arm 122. The actuator is operable to adjust the attaching portion 120 (and the reflective element fixedly attached thereto) to adjust the rearward field of view of the driver at the reflective element. The actuator may also be operable to move the mirror head about a generally vertical pivot axis to provide a powerfold function. The actuator may utilize aspects of the mirror actuators described in U.S. Pat. No. 8,915,601, which is hereby incorporated herein by reference in its entirety.

In the illustrated embodiment, the mounting arm is fixedly mounted at the sail portion 124 (which may be fixedly attached at the side of the vehicle, such as at the door of the vehicle or the like) and extends generally horizontally and laterally outward therefrom. The mirror head 116 is attached at the outer end of the mounting arm 122, and the attaching portion 120 is adjustably received in the mirror casing 114 of the mirror head. The attaching portion 120 includes a shroud or inner casing that is received in the mirror casing and that spans the gap between the reflective element and the open end of the mirror casing, such as in a similar manner as discussed above with respect to mirror assembly 10. In the illustrated embodiment, the mirror casing 114 of mirror head 116 has a small or reduced size profile relative to the profile of the reflective element and is sized to house the actuators and the attaching portion, with the reflective element extending substantially laterally outwardly and inwardly from the mirror head. Thus, the mirror assembly 110 provides an aerodynamic style with an aesthetic appearance and a reduced size mirror head housing. Optionally, the housing of the mirror head may have an increased size and may generally correspond with the profile of the reflective element, depending on the particular application of the exterior rearview mirror assembly.

The mirror reflective element may be disposed relative to the exterior mirror casing/shell such as described in U.S. Pat. No. 8,049,640 and/or in International Publication Nos. WO 2012/051500; WO 2010/124064 and/or WO 2011/044312, which are hereby incorporated herein by reference in their entireties.

Thus, the exterior rearview mirror assembly of the present invention provides a frameless exterior or sail mount mirror assembly. The actuators may adjust the reflective element relative to the mirror casing. The dual actuator (or multiple degrees of freedom actuator or actuators) of the exterior rearview mirror assembly or system of the present invention thus provides a mirror head that can be any shape and that houses actuators that operate to adjust or orient the reflective element relative to the mirror housing or casing. The mirror reflective element can be adhered or otherwise fixedly attached at a surface or mounting portion of the attaching portion, which is adjustably received or at least partially received, in the mirror head, and the mirror head can be any shape (such as generally flat or having a narrow or thin profile or the like) depending on the particular application of the mirror assembly and the vehicle manufacturer's design preferences.

Optionally, the exterior rearview mirror assembly may comprise a frameless outside mirror reflective element that provides for adjustment of the mirror reflective element and mirror casing via use of a single actuator located in the head of the mirror. The actuator adjusts the reflective element and mirror casing (the mirror head) relative to a base portion or mounting arm of the mirror assembly. For example, and with reference to FIGS. 13-20, an exterior rearview mirror assembly 210 includes a mirror reflective element 212 attached at an actuator 220 (via a back plate 224 and a head mounting plate 226) that is operable to adjust the mirror reflective element relative to a bracket or base or arm 222. The mirror head 216 includes the mirror reflective element 212, which is attached to the back plate or glass case 224, which is attached at the head mounting plate 226, which has the mirror casing 214 attached thereto. The mirror head 216 is adjustable relative to the arm 222 via the actuator 220 fixedly attached at a bracket portion 222a of the arm 222. A mounting post or structure 222b of the arm 222 is received through a gap or opening 214a of the mirror casing 214, with the opening 214a providing clearance or a gap between the casing wall and the mounting post to allow for adjustment of the mirror casing and reflective element (the mirror head) relative to the arm 222. As shown in FIGS. 14, 16, 17, 19 and 20, a gasket 228 is provided at the post 222b to generally seal or close over the opening of the mirror casing to limit water or dirt intrusion into the mirror casing.

The actuator 220 is mounted at the bracket portion 222a at the upper end of mounting post or structure 222b and is operable to adjust the mirror back plate and reflective element and mirror casing to adjust the rearward field of view of the driver at the reflective element. In the illustrated embodiment, the mounting arm 222 is pivotally mounted at a bracket 230, which mounts at the side of a vehicle. The mounting arm 222 and mirror head 216 may pivot about a generally vertical or canted pivot axis to provide a breakaway mirror configuration (and optionally, another actuator may be disposed at the arm or bracket to provide a powerfold function).

In the illustrated embodiment, the mirror casing is fixed relative to the glass or reflective element and is adjustable via an actuator relative to the bracket or mounting arm. In a typical outside mirror, the reflective element is adjustable independently of the mirror head, which is fixed to the bracket. In the illustrated embodiment, the mirror casing moves with the reflective element (so that the mirror head is adjusted to adjust the rearward field of view at the reflective element). For sake of clarity, the assembly of the mirror casing, head mounting plate, glass-case or back plate, tape and reflective element is referred to as the mirror head or mirror head assembly. The bracket design is used as a mount for the actuator and is coupled with the base (via the mounting arm) to provide a folding pivot.

Travel stops between the head mounting plate and the bracket allow high static loads to bypass the actuator in most load cases. When a load is applied to the mirror head or glass, it will move until contact is made at one or more of the travel stops. These travel stops work in the X and Y adjustment axes of the actuator as well as a rotational axis normal to the glass plane. The head mounting plate can also contain locations for spring fingers that interface with the bracket to provide better stability for the mirror head assembly. The travel stops may comprise part of the actuator mounting bracket of the mounting arm, whereby the travel stops extend towards the attachment plate at the rear of the reflective element and engage the attachment plate when the reflective element and attachment plate are moved or pivoted their maximum selected or designed amount.

To allow for full adjustment of the reflective element, the mirror head assembly has a gap or aperture where the bracket and bracket shells enter. In order to prevent visibility into the mirror head assembly and close it off to the environment, a gasket surrounds the bracket and interfaces with the inside of the bottom of the mirror head assembly, thus substantially closing and sealing the aperture or gap between the bracket and the mirror casing.

To allow for serviceability, the back plate is attached at a head mounting plate, which allows for a screw or clip attachment of the mirror casing to the mounting plate and also proper alignment and assembly of the reflective element to the back plate or glass-case. The back plate has attachment features that securely connect it to the head mounting plate. The reflective element sub-assembly (which is made up of the back plate, tape, and reflective element) is then able to be serviced or removed from the mirror head assembly to allow for replacement of the reflective element sub-assembly or repair or replacement of features inside the mirror head assembly such as the actuator, turn signals, ground illuminator light modules and/or the like.

Figure 21:
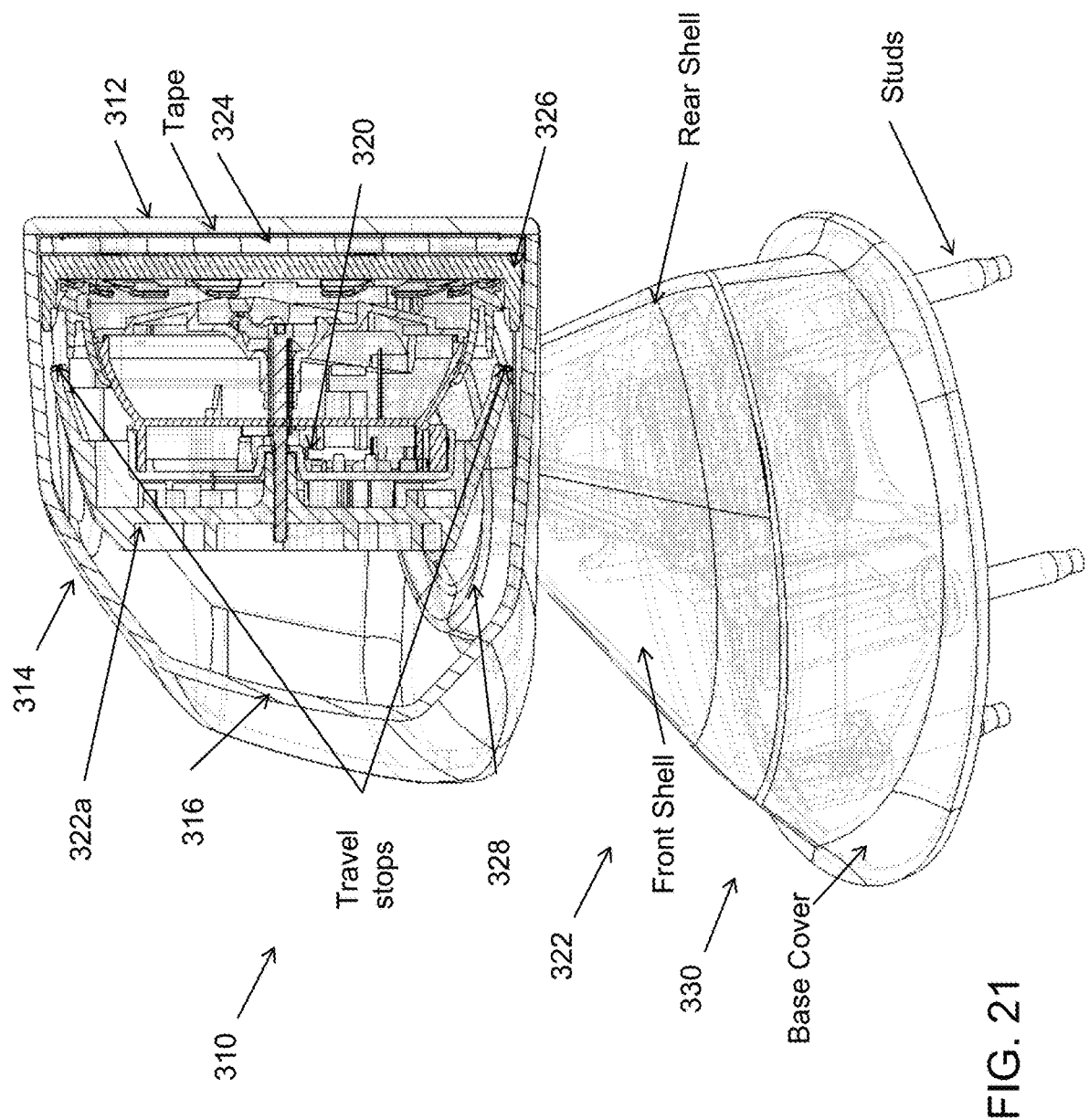
FIG. 21 is a sectional view of another exterior rearview mirror assembly in accordance with the present invention.
Figure 22:
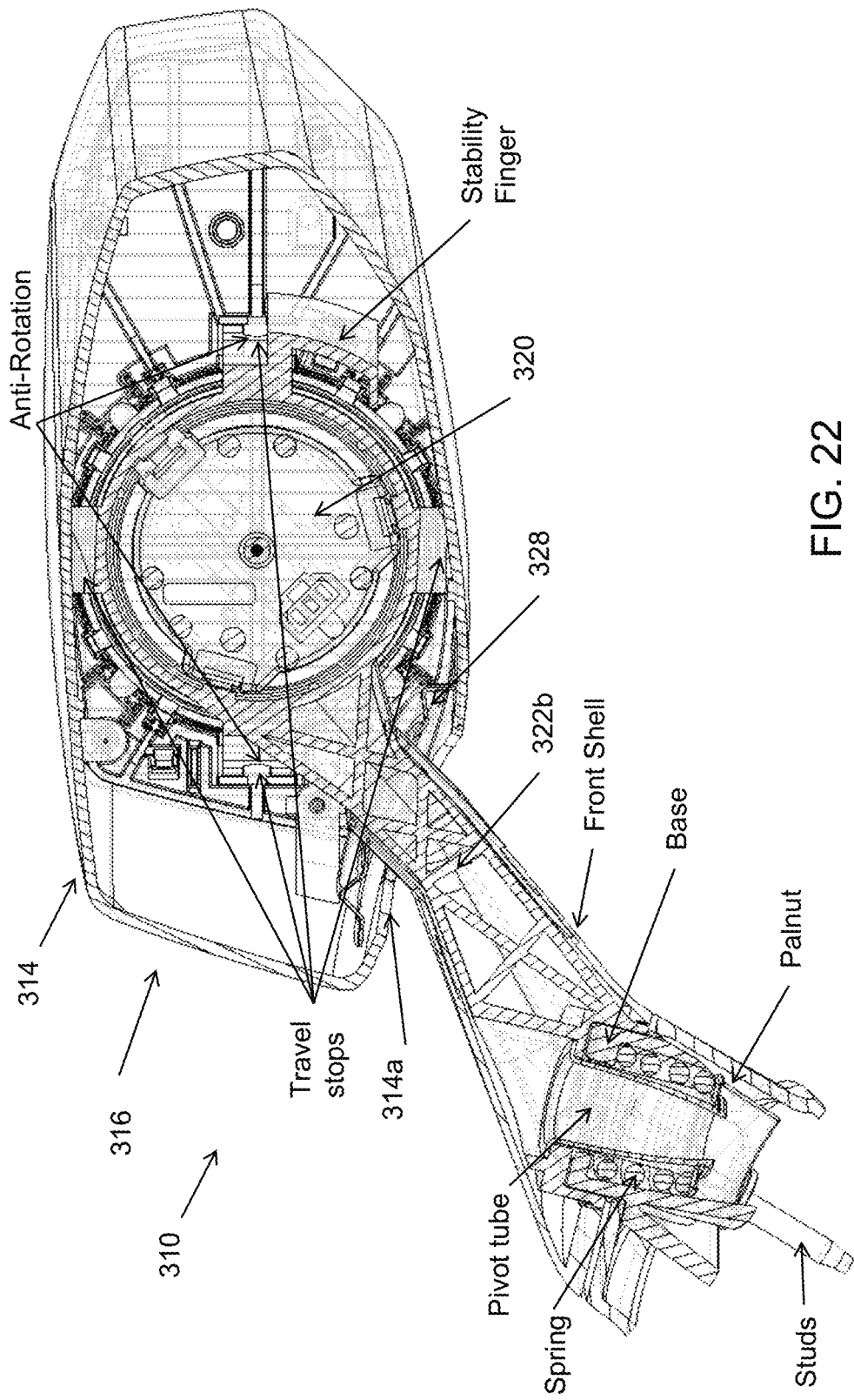
FIG. 22 is a partial sectional view of the exterior rearview mirror assembly of FIG. 21.
Figure 23:
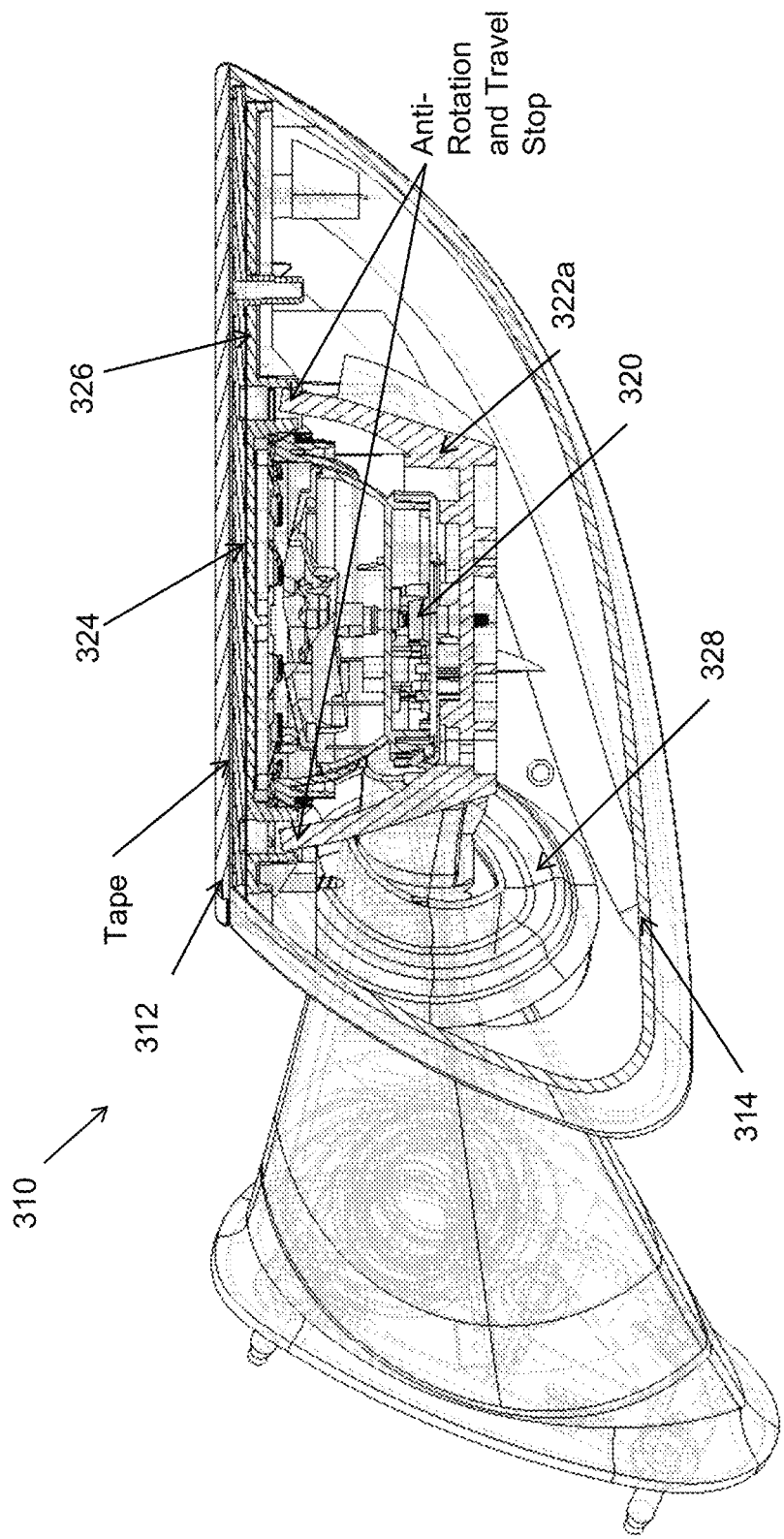
FIG. 23 is another partial sectional view of the exterior rearview mirror assembly of FIG. 21.
Figure 24:
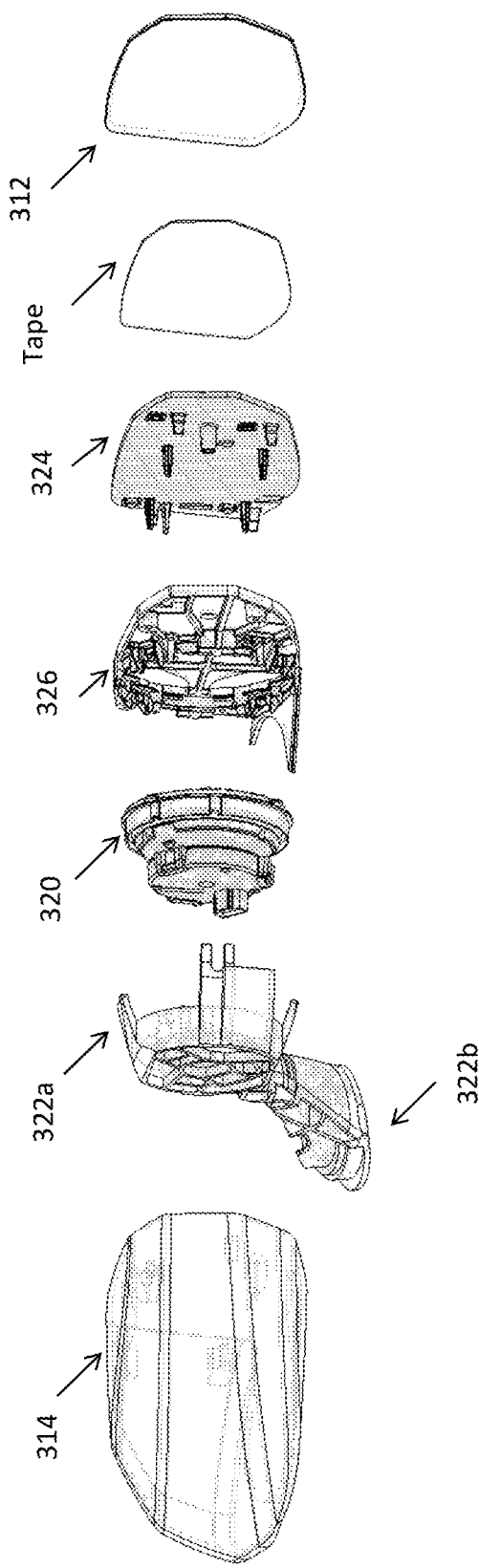
FIG. 24 is an exploded perspective view of the exterior rearview mirror assembly of FIG. 21.

Optionally, and with reference to FIGS. 21-24, an exterior rearview mirror assembly 310 includes a mirror reflective element or surface 312 attached at an actuator 320 (via a back plate 324 and a head mounting plate 326) that is operable to adjust the mirror reflective element relative to a bracket or base or arm 322, such as in a similar manner as discussed above. The mirror head 316 includes the mirror reflective element 312, which is attached to the back plate or glass case 324, which is attached at the head mounting plate 326, which has the mirror casing 314 attached thereto. The mirror head 316 is adjustable relative to the arm 322 via the actuator 320 fixedly attached at a bracket portion 322a that is attached to the arm 322. A mounting post or structure or bracket portion 322b of the arm 322 is received through a head adjustment gap or opening 314a of the mirror casing 314, with the opening 314a providing clearance or a gap between the casing wall and the mounting post to allow for adjustment of the mirror casing and reflective element (the mirror head) relative to the arm 322. As shown in FIGS. 21-23, a gasket 328 is provided at the post 322b to generally seal or close over the opening of the mirror casing to limit water or dirt intrusion into the mirror casing.

The actuator 320 is mounted at the bracket portion 322a at the upper end of mounting post or structure 322b and is operable to adjust the mirror back plate and reflective element and mirror casing to adjust the rearward field of view of the driver at the reflective element. The actuator includes a mounting arm attachment portion that fixedly mounts the actuator at the end of the mounting arm and inside the mirror casing, with a mirror attaching portion of the actuator attaching at the head mounting plate. During operation of the actuator, the reflective element and the mirror casing adjust in tandem relative to the mounting arm.

In the illustrated embodiment, the mounting arm 322 is pivotally mounted at a bracket or base 330, which mounts at the side of a vehicle (such as via studs or the like), with the base and bracket encased by a shell or casing (such as a front shell and a rear shell) and/or cover. The mounting arm 322 and mirror head 316 may pivot about a generally vertical or canted pivot axis to provide a breakaway mirror configuration (and optionally, another actuator may be disposed at the arm or bracket to provide a powerfold function). For example, and as can be seen with reference to FIG. 22, the base of the mounting arm structure may include a pivot tube and spring to allow for pivotal movement of the mounting arm at the pivot tube for breakaway movement (or powerfold movement or adjustment) of the mirror head and mounting arm relative to the base and the side of the vehicle at which the mirror assembly is mounted. The mirror assembly 310 may be similar to the mirror assemblies discussed above, such that a detailed discussion of the mirror assemblies need not be repeated herein.

Figure 25:
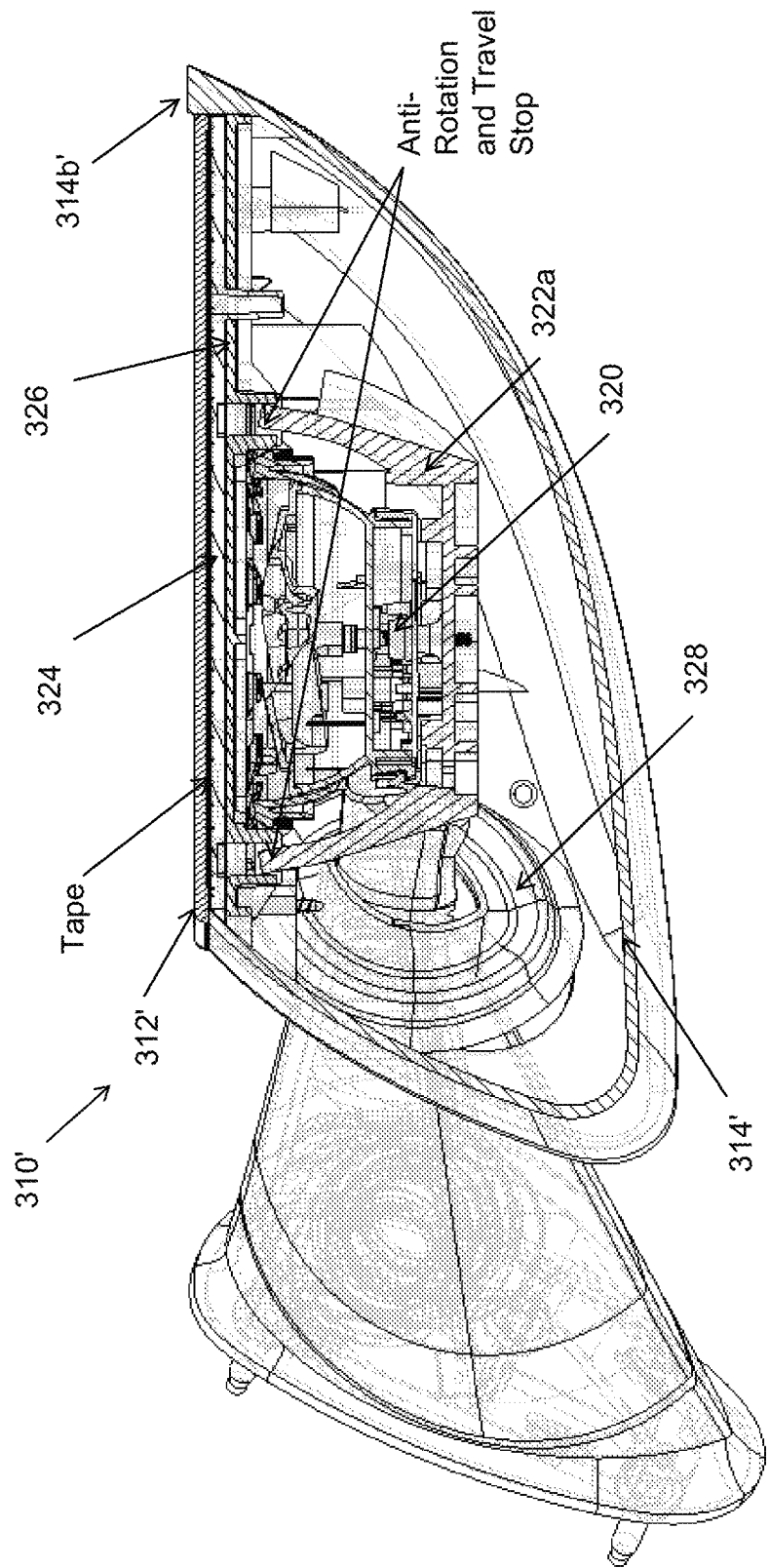
FIG. 25 is a sectional view of another exterior rearview mirror assembly of the present invention, shown with an extended head casing portion that extends to an outboard edge region of the reflective element.
Figure 26:
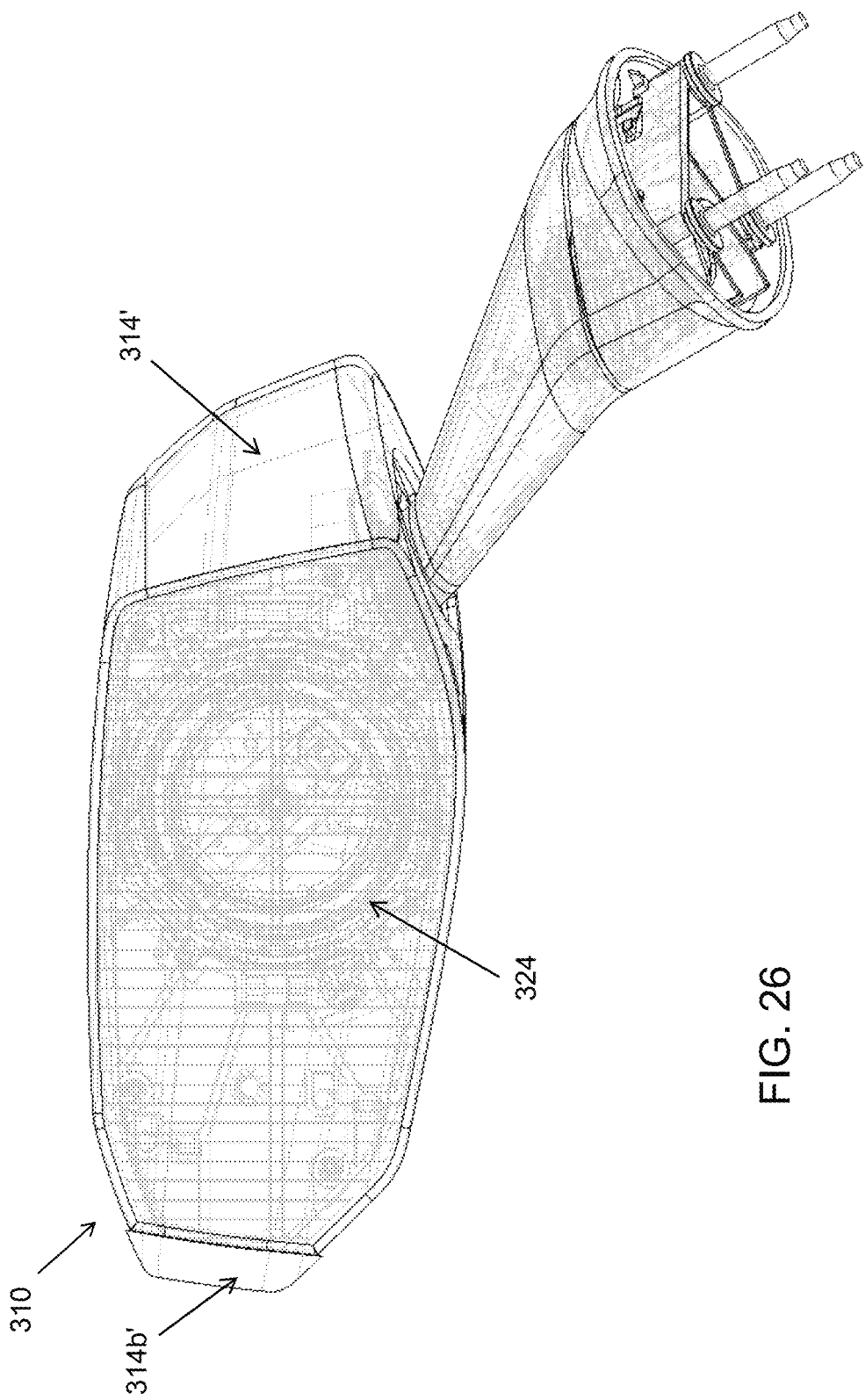
FIG. 26 is a perspective view of the exterior rearview mirror assembly of FIG. 25.

Optionally, and such as shown in FIGS. 25 and 26, the mirror assembly 310' may have a mirror casing 314' that includes an extended or outboard portion 314b' that overlaps the outboard edge of the reflective element 312'. The outboard portion or rib or structure 314b' at the outboard part of the housing helps to protect the glass reflective element, such as when the exterior mirror may impact an object or the like. The outboard portion or rib may also or otherwise be part of a turn signal module, whereby an indicator may be incorporated in or integrated into the rib or structure to provide an indicator outboard of the reflective element. The mirror assembly 310' may otherwise be substantially similar to mirror assembly 310, discussed above, such that a detailed discussion of the mirror assemblies need not be repeated herein. The similar or common components or elements of the mirror assemblies 310, 310' are shown in the drawings with similar or common reference numbers.

The mirror assembly of the present invention allows for inclusion of other accessories (such as turn signal indicators, blind spot indicators, lights, displays and/or the like) in the mirror head, without concerns of interference with conventional actuators disposed in the mirror head and at and behind the mirror reflective element. The exterior rearview mirror assembly and/or actuators may utilize aspects of the exterior rearview mirror assemblies described in U.S. Pat. Nos. 8,915,601; 8,764,256; 7,722,199; 7,314,285; 7,267,449; 7,159,992; 7,104,663; 7,093,946; 7,080,914; 7,073,914; 6,916,100; 6,755,544; 6,698,905; 6,685,864; 6,467,920; 6,362,548; 6,312,135; 6,243,218; 6,229,226; 6,213,612; 5,986,364; 5,900,999 and/or 5,703,731, and/or U.S. Publication No. 2007/002477, and/or U.S. patent application Ser. No. 13/663,542, filed Oct. 30, 2012, now U.S. Pat. No. 9,067,541, and/or International Publication Nos. WO 2013/126719 and/or WO 2013/071070, which are all hereby incorporated herein by reference in their entireties.

Optionally, for example, the technology of the present invention allows for new technology or content to be readily added to and mounted into the mirror head. For example, the mirror head may include a camera disposed behind the reflective element, and/or the mirror head may include a display screen (such as a liquid crystal display screen or the like) disposed behind the reflective element and/or the mirror head may include any other electronic or mechanical content, such as, for example, a blind spot indicator and/or a turn signal indicator and/or an illumination module and/or wide angle reflector elements and/or the like (such as by utilizing aspects of the exterior mirror assemblies described in U.S. Pat. Nos. 8,786,704; 8,058,977; 7,944,371; 7,492,281; 6,198,409; 5,929,786; 5,786,772; 7,581,859; 6,227,689; 6,582,109; 5,371,659; 5,497,306; 5,669,699; 5,823,654; 6,176,602; 6,276,821; 7,748,856; 7,255,451; 7,195,381; 6,717,712; 7,126,456; 6,315,419; 7,097,312 and/or 6,522,451, and/or International Publication No. WO 2006/124682, which are hereby incorporated herein by reference in their entireties).

Optionally, the reflective element may comprise a frameless reflective element, such as the types shown and/or described in U.S. Des. Pat. Nos. D633,423; D633,019; D638,761 and/or D647,017, and/or International Publication Nos. WO 2013/126719; WO 2013/071070; WO 2012/051500; WO 2010/124064 and/or WO 2011/044312, and/or U.S. Pat. Nos. 7,253,723 and/or 8,154,418, which are hereby incorporated herein by reference in their entireties. In such an application, the mirror reflective element may have a rounded or ground perimeter edge region at its periphery of the front surface, and such a rounded or ground or polished perimeter edge region of the glass substrate of the reflective element may be exposed to or viewable by the driver of the vehicle and may comprise a polished perimeter that is polished to a water-clear finish and may have a radius of curvature of at least about 2.5 mm. The rounded perimeter edge of the glass substrate of the mirror reflective element may provide a generally smooth or continuous transition from the generally planar (or slightly curved) front surface of the mirror reflective element to the outer surface of the mirror head or mirror casing at which the mirror reflective element is mounted. Optionally, the mirror reflective element may have a thin or very thin bezel at the perimeter region of the front surface of the reflective element, and optionally, the mirror reflective element may have a clear bezel at the perimeter region of the front surface of the reflective element, or the like, depending on the particular application of the mirror assembly and the desired appearance and/or styling of the mirror assembly.

Optionally, the exterior sideview or rearview mirror assembly may utilize aspects of the mirror assemblies described in U.S. Pat. No. 7,777,611 and/or International Publication No. WO 2013/067082, which are hereby incorporated herein by reference in their entireties.

The present invention also benefits from, and optionally utilizes, aspects of the single motor actuation and mechanical/electrical construction as described in U.S. Pat. No. 7,322,710, which is hereby incorporated herein by reference in its entirety. For example, an actuator may be used that comprises a clutch assembly that selectively transfers torque from an actuator motor to one of at least two output shafts based on the speed of the actuator motor. One output shaft can pivot about a first axis of rotation, and another output shaft can pivot about a second axis of rotation. Optionally, one output shaft can pivot the mirror head and another output shaft can extend and retract the mirror head, such as is beneficial for use in an extendable/trailer tow exterior rearview mirror of an equipped vehicle.

Optionally, other mirror designs or configurations may be contemplated in accordance with the present invention, such as various configurations of the mirror casing and reflective element and any bezel at the mirror reflective element. For example, the mirror assembly may include a plastic molding that comprises a portion that (a) abuts a circumferential edge of the mirror glass substrate (such as the front glass substrate of an electrochromic mirror reflective element or a glass prism of a prismatic mirror reflective element) and (b) has an outer curved surface that extends from generally adjacent to a first surface of the glass substrate and that may lack a sharp edge, such as described in U.S. Pat. Nos. 7,255,541; 7,289,037; 7,360,932; 8,049,640 and/or 8,529,108, which are hereby incorporated herein by reference in their entireties. Optionally, the mirror assembly may include a conventional bezel, such as described in U.S. Pat. No. 7,224,324, which is hereby incorporated herein by reference in its entirety.

The overall mirror assembly may comprise a modular exterior rearview mirror assembly, such as described in U.S. Pat. No. 6,146,003, which is hereby incorporated herein by reference in its entirety, and/or may be constructed in accordance with U.S. Pat. No. 6,481,878, which is hereby incorporated herein by reference in its entirety.

Optionally, the mirror assembly may include various other features, such as lighting and/or indicators and/or blind spot detectors and/or wide angle reflectors or spotter mirrors and/or the like. For example, the mirror assembly may include any other electronic or mechanical content, such as, for example, a blind spot indicator and/or a turn signal indicator and/or an illumination module and/or wide angle reflector elements and/or the like (such as by utilizing aspects of the exterior mirror assemblies described in U.S. Pat. Nos. 8,786,704; 8,058,977; 7,944,371; 7,492,281; 6,198,409; 5,929,786; 5,786,772; 7,581,859; 6,227,689; 6,582,109; 5,371,659; 5,497,306; 5,669,699; 5,823,654; 6,176,602; 6,276,821; 7,748,856; 7,255,451; 7,195,381; 6,717,712; 7,126,456; 6,315,419; 7,097,312 and/or 6,522,451, and/or International Publication No. WO 2006/124682, which are hereby incorporated herein by reference in their entireties).

Optionally, for example, the mirror reflective element suitable for use in accordance with the present invention may be made by (or may be supplied to) the exterior rearview mirror manufacturer as a module or unitary sub-assembly that comprises at least a mirror reflective element (that may be a fixed reflectance mirror reflective element such as a chrome coated glass substrate/shape or that may be an electrochromic or otherwise electro-optically active exterior mirror reflective element, preferably a laminate-type electrochromic mirror reflective element). The unitary reflective element sub-assembly may also include a heater (such as a heater pad or the like) operable to deice/demist the front/first surface of the mirror reflective element. The unitary reflective element sub-assembly may also include a backing plate and/or backing/attachment structure or elements for attaching the unitary reflective element sub-assembly at the mirror head. Optionally, the mirror element of the reflective element sub-assembly may include a blind spot viewing auxiliary wide angle spotter mirror element that may be of the integrated type (such as described in U.S. Pat. No. 6,315,419 and/or U.S. Pub. No. 2008/0225421, which are hereby incorporated herein by reference in their entireties) or that may be a coplanar type or a circular spotter type or a WideVue™ type or construction (such as supplied by Magna Mirrors of Holland, Mich.), such as in accordance with U.S. Pat. Nos. 6,522,451; 6,717,712; 7,167,294; 7,589,883 and/or 8,267,534, which are hereby incorporated herein by reference in their entireties. Also, the unitary reflective element sub-assembly may comprise an extended field of view mirror reflective element, such as a reflective element utilizing aspects of the mirrors described in U.S. Pat. No. 7,420,756, which is hereby incorporated herein by reference in its entirety.

Optionally, for example, a bezel portion or lighting device may be disposed at the reflective element and/or the mirror casing via any suitable means, such as by utilizing aspects of the mirror assemblies described in U.S. Pat. No. 7,360, 932, and/or U.S. patent application Ser. No. 13/644,593, filed Oct. 4, 2012 and published Apr. 11, 2013 as U.S. Publication No. US-2013-0088884, which are hereby incorporated herein by reference in their entireties. The functional capabilities of such a lighting device should meet the desired or required functional requirements of the OEM and any regulation requirements. The lighting device provides a means of illuminating the perimeter of the mirror reflective element of the exterior rearview mirror assembly and allows for customized light colors. For example, the illumination feature may operate in conjunction with or corresponding to a selected custom color for the interior lighting of the vehicle (such as MYCOLOR® offered by Ford Motor Company), whereby the illumination color emitted by an illumination source or sources or lighting element of the exterior rearview mirror assembly may be selected or customized by the user to a desired color or color combination. The colored illumination scheme may be selected to match the lighting scheme of the vehicle at which the mirror assembly is mounted or the owner of the vehicle may separately select a color scheme to customize or personalize the exterior rearview mirror assembly (such as by utilizing aspects of the mirror assemblies described in U.S. Pat. Nos. 7,626,749; 7,255,451 and/or 7,289,037, which are hereby incorporated herein by reference in their entireties).

Optionally, the mirror assembly and/or a mirror system of the vehicle may include one or more displays, such as the types disclosed in U.S. Pat. Nos. 5,530,240 and/or 6,329, 925, which are hereby incorporated herein by reference in their entireties, and/or display-on-demand transflective type displays, such as the types disclosed in U.S. Pat. Nos. 8,890,955; 7,855,755; 7,734,392; 7,370,983; 7,338,177; 7,274,501; 7,255,451; 7,195,381; 7,184,190; 7,046,448; 6,902,284; 6,428,172; 6,420,975; 5,668,663; 5,724,187; 6,690,268; 5,416,313; 5,285,060; 5,193,029 and/or 4,793, 690, and/or in U.S. patent application Ser. No. 09/585,379, filed Jun. 1, 2000, now abandoned, and/or Ser. No. 10/207, 291, filed Jul. 29, 2002, now abandoned, and/or U.S. Pat. Pub. Nos. US-2006-0061008; US-2006-0050018; US-2009-0015736; US-2009-0015736 and/or US-2010-0097469, and/or International Publication No. WO 2011/028686, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, such as the types disclosed in U.S. Pat. Nos. 5,550,677; 5,760,962; 6,396,397; 6,097, 023; 5,877,897 and 5,796,094, and/or U.S. Publication No. US-2006-0171704, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, a rear camera, such as a rear backup video camera/imager or the like (such as a camera and system of the types described in U.S. Pat. Nos. 5,550,677; 5,670,935; 6,498,620; 6,222,447 and/or 5,949,331, which are hereby incorporated herein by reference in their entireties), may be disposed at the vehicle (such as at a rear portion of the vehicle and/or at one or both sideview mirrors of the vehicle) and may have a rearward field of view rearward of the vehicle for capturing images rearward of the vehicle such as for driver assistance during a reversing maneuver of the vehicle or the like. Because such a rear camera has a rearward field of view, the rearward facing camera may be operable to capture images of rearwardly approaching or following vehicles that are behind the vehicle equipped with the rearward facing camera when the vehicle so equipped is driving forwardly along the road or highway. It is envisioned that an image processor or controller (such as an EyeQ™ image processing chip available from Mobileye Vision Technologies Ltd. of Jerusalem, Israel, and such as an image processor of the types described in International Publication No. WO 2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing. Using principles of the systems described in U.S. Pat. No. 5,550,677, which is hereby incorporated herein by reference in its entirety, the system may operate to independently control any one or more of the interior rearview mirror assembly and the exterior rearview mirror assemblies of the equipped vehicle, such as based on the intensity and location of glare light detected by the camera and image processor. Such a rear reversing or backup camera and controller can also operate to detect the ambient light level present at the vehicle and may adjust the dimming of the mirror system accordingly, and/or may adjust other displays, lighting and/or accessories of the vehicle in accordance with and responsive to the ambient light detection by the rear backup camera (or by other cameras on the vehicle that view exterior to the vehicle). Such glare detection and ambient light detection and image processing of image data captured by a rear backup assist camera of the vehicle may obviate the need for a separate glare sensor elsewhere at the vehicle, such as at or in the interior rearview mirror assembly of the vehicle or the like. Such image processing and such a mirror control system may utilize aspects of the imaging systems described in U.S. Pat. Nos. 5,550,677; 5,670,935; 5,760,962; 6,201, 642; 6,396,397; 6,498,620; 6,097,023; 5,877,897 and/or 5,796,094, which are hereby incorporated herein by reference in their entireties.

Optionally, the mirror assembly may include other electrically operated or powered accessories, such as a compass sensor and compass display. Such a compass sensor and circuitry for the compass system that detects and displays the vehicle directional heading to a driver of the vehicle may comprise any suitable compass sensor and/or circuitry, such as a compass system and compass circuitry that utilizes aspects of the compass systems described in U.S. Pat. Nos. 7,370,983; 7,329,013; 7,289,037; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and/or 6,513,252, and/or European patent application, published Oct. 11, 2000 under Publication No. EP 0 1043566, and/or U.S. Pat. Pub. No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The compass sensor may be incorporated in or associated with a compass system and/or display system for displaying a directional heading of the vehicle to the driver, such as a compass system of the types described in U.S. Pat. Nos. 7,289,037; 5,924,212; 4,862,594; 4,937,945; 5,131,154; 5,255,442; 5,632,092 and/or 7,004,593, which are all hereby incorporated herein by reference in their entireties. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two sensor elements (such as magneto-responsive sensor elements, or a Hall effect sensor or multiple Hall effect sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an application specific integrated chip ("ASIC"), such as utilizing principles described in U.S. Pat. Nos. 7,815,326; 7,004,593; 7,329,013 and/or 7,370,983, and/or U.S. Pat. Pub. No. US-2006-0061008, which are hereby incorporated herein by reference in their entireties, and/or such as by utilizing aspects of an EC driver-on-a-chip such as described in U.S. Pat. No. 7,480,149, which is hereby incorporated herein by reference in its entirety.

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,420,036; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or International Publication No. WO 2010/114825, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or reflective element of the mirror assembly) and circuitry and/or an ambient light sensor and circuitry may be provided on one or more circuit boards of the mirror assembly.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, and/or U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

The exterior rearview mirror assembly may include a casing, such as described above, or the mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, and/or in U.S. Pat. Pub. Nos. US-2006-0061008 and/or US-2006-0050018, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and/or 6,690,268, and/or U.S. Pat. Pub. Nos. US-2006-0050018 and/or US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451 and/or 7,289,037, which are hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052 and/or 6,678,614, and/or U.S. Publication No. US-2006-0050018, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. Publication No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4 wd/2 wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and publications being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577; 7,004,606 and/or 7,720,580, and/or U.S. Publication Nos. US-2006-0171704; US-2009-0244361 and/or US-2010-0214791, and/or International Publication Nos.

WO 2009/046268 and/or WO 2009/036176, which are all hereby incorporated herein by reference in their entireties. The sensor may include a lens element or optic between the imaging plane of the imaging sensor and the forward scene to substantially focus the scene at an image plane of the imaging sensor. The imaging sensor may comprise an image sensing module or the like, and may utilize aspects described in U.S. Pat. Pub. Nos. US-2006-0171704 and/or US-2009-0244361, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. An exterior rearview mirror assembly configured for mounting at an exterior portion of a side door of a vehicle, said exterior rearview mirror assembly comprising:

a mirror head comprising a mirror attachment plate, a mirror casing and a mirror reflective element;

wherein said mirror reflective element has a front side and a rear side opposite said front side, and wherein said front side is separated from said rear side by a thickness dimension of said mirror reflective element;

wherein said mirror reflective element comprises a glass substrate having a front surface and a rear surface and having a circumferential plate edge spanning between said front surface and said rear surface;

wherein said front surface of said glass substrate is at said front side of said mirror reflective element;

wherein said mirror head comprises a perimeter framing portion circumscribing said circumferential plate edge of said glass substrate;

wherein no portion of said perimeter framing portion of said mirror head encroaches onto said front side of said mirror reflective element;

wherein said mirror attachment plate has a first side and a second side, and wherein said first side is separated from said second side by a thickness dimension of said mirror attachment plate;

wherein said rear side of said mirror reflective element is attached at said first side of said mirror attachment plate;

an electrically-operated actuator at one end of a mounting arm of said exterior rearview mirror assembly;

wherein said electrically-operated actuator is disposed at the one end of said mounting arm of said exterior rearview mirror assembly;

wherein said second side of said mirror attachment plate of said mirror head is attached at said electrically-operated actuator that is disposed at the one end of said mounting arm of said exterior rearview mirror assembly;

wherein a mounting portion configured for mounting of said exterior rearview mirror assembly at an exterior portion of a side door of a vehicle equipped with said exterior rearview mirror assembly is disposed at another end of said mounting arm;

wherein, with said exterior rearview mirror assembly mounted at the exterior portion of the side door of the equipped vehicle, said mounting portion is mounted at the exterior portion of the side door of the equipped vehicle;

wherein, with said exterior rearview mirror assembly mounted at the exterior portion of the side door of the equipped vehicle, said front side of said mirror reflective element is closer to a driver of the equipped vehicle than said rear side of said mirror reflective element and is contactable by the driver of the equipped vehicle;

wherein, with said exterior rearview mirror assembly mounted at the exterior portion of the side door of the equipped vehicle, said front surface of said glass substrate of said mirror reflective element is viewable by the driver of the equipped vehicle;

wherein, with said exterior rearview mirror assembly mounted at the exterior portion of the side door of the equipped vehicle, said electrically-operated actuator is electrically operable to move said mirror head relative to said mounting arm to vertically and horizontally adjust a rearward view provided by said mirror reflective element to the driver of the equipped vehicle who is viewing said mirror reflective element;

wherein movement of said mirror head moves said mirror attachment plate, said mirror reflective element and said mirror casing together in tandem;

wherein said mounting arm passes through an aperture of said mirror head, and wherein a gap exists between said mirror head and said mounting arm where said mounting arm passes through said aperture of said mirror head;

wherein attachment of said electrically-operated actuator at said mounting arm is inside said mirror head;

wherein the gap provides clearance between said mirror head and said mounting arm to allow for movement of said mirror head relative to said mounting arm during electrical operation of said electrically-operated actuator; and wherein a gasket is disposed at said aperture of said mirror head to limit intrusion of contaminants into said mirror head.

2. The exterior rearview mirror assembly of claim 1, wherein another electrically-operated actuator is disposed at where, with said exterior rearview mirror assembly mounted at the exterior portion of the side door of the equipped vehicle, said mounting portion of said mounting arm mounts at the exterior portion of the side door of the equipped vehicle.

3. The exterior rearview mirror assembly of claim 2, wherein the other electrically-operated actuator disposed at the other end of said mounting arm, when electrically operated, moves said mirror head between an extended position relative to the exterior portion of the side door of the equipped vehicle and a folded position relative to the exterior portion of the side door of the equipped vehicle.

4. The exterior rearview mirror assembly of claim 1, wherein the other end of said mounting arm that is, with said exterior rearview mirror assembly mounted at the exterior portion of the side door of the equipped vehicle, at the exterior portion of the side door of the equipped vehicle, comprises a breakaway joint that allows said mirror head be manually moved between an extended position relative to the exterior portion of the side door of the equipped vehicle and a folded position relative to the exterior portion of the side door of the equipped vehicle.

5. The exterior rearview mirror assembly of claim 1, wherein said mirror head houses at least one accessory that is disposed in said mirror casing of said mirror head.

6. The exterior rearview mirror assembly of claim 1, wherein said perimeter framing portion comprises a portion of said mirror attachment plate.

7. The exterior rearview mirror assembly of claim 1, wherein said perimeter framing portion comprises a portion of said mirror casing.

8. The exterior rearview mirror assembly of claim 1, wherein said rear side of said mirror reflective element is adhesively attached at said first side of said mirror attachment plate.

9. The exterior rearview mirror assembly of claim 1, wherein said mirror head houses a blind spot indicator and at least one selected from the group consisting of (i) a CMOS camera (iii) a turn signal indicator and (iii) a puddle lamp.

10. The exterior rearview mirror assembly of claim 1, wherein said front surface of said glass substrate is coated with a mirror reflector.

11. The exterior rearview mirror assembly of claim 1, wherein said mounting portion of said mounting arm is mounted at the exterior portion of the side door of the equipped vehicle via another electrically-operated actuator of said exterior rearview mirror assembly, and wherein said exterior rearview mirror assembly comprises a powerfold mirror assembly that, with said mounting portion mounted at the exterior portion of the side door of the equipped vehicle, provides a powerfold function that moves said mirror head between an extended position relative to the exterior portion of the side door of the equipped vehicle and a folded position relative to the exterior portion of the side door of the equipped vehicle, and wherein the powerfold function is provided by said another electrically-operated actuator of said exterior rearview mirror assembly.

12. The exterior rearview mirror assembly of claim 1, wherein said mirror casing includes an outboard portion that includes a turn signal indicator.

13. The exterior rearview mirror assembly of claim 1, wherein said mirror head houses a CMOS camera.

14. The exterior rearview mirror assembly of claim 1, wherein said electrically-operated actuator includes a base portion that is fixedly mounted at the one end of said mounting arm.

15. The exterior rearview mirror assembly of claim 1, wherein said mirror head houses at least two selected from the group consisting of (i) a camera (ii) a blind spot indicator, (iii) a turn signal indicator and (iv) a puddle lamp.

16. An exterior rearview mirror assembly configured for mounting at an exterior portion of a side door of a vehicle, said exterior rearview mirror assembly comprising:
a mounting arm comprising a mounting end, said mounting end comprising a mounting portion configured for mounting of said exterior rearview mirror assembly at an exterior portion of a side door of a vehicle equipped with said exterior rearview mirror assembly;
a mirror head comprising a mirror attachment plate, a mirror casing and a mirror reflective element;
wherein said mirror reflective element has a front side and a rear side opposite said front side, and wherein said front side is separated from said rear side by a thickness dimension of said mirror reflective element;
wherein said mirror reflective element comprises a glass substrate having a front surface and a rear surface and having a circumferential plate edge spanning between said front surface and said rear surface;
wherein said front surface of said glass substrate is at said front side of said mirror reflective element;
wherein said mirror head comprises a perimeter framing portion circumscribing said circumferential plate edge of said glass substrate;
wherein no portion of said perimeter framing portion of said mirror head encroaches onto said front side of said mirror reflective element;
wherein said mirror attachment plate has a first side and a second side, and wherein said first side is separated from said second side by a thickness dimension of said mirror attachment plate;
wherein said rear side of said mirror reflective element is attached at said first side of said mirror attachment plate;
an electrically-operated actuator;
wherein said mounting arm comprises an actuator end having said electrically-operated actuator disposed thereat;
wherein said electrically-operated actuator is attached at said actuator end of said mounting arm;
wherein said electrically-operated actuator is attached at said second side of said mirror attachment plate;
wherein attachment of said electrically-operated actuator at said actuator end of said mounting arm is inside said mirror head;
wherein said mounting arm passes through an aperture of said mirror head;
wherein a gap exists between said mirror head and said mounting arm where said mounting arm passes through said aperture of said mirror head;
a gasket disposed at said aperture of said mirror head, wherein said gasket spans said gap between said mounting arm and said mirror head at said aperture to limit intrusion of contaminants into said mirror head;
wherein, with said exterior rearview mirror assembly mounted at the exterior portion of the side door of the equipped vehicle, said front side of said mirror reflective element is closer to a driver of the equipped vehicle than said rear side of said mirror reflective element and is contactable by the driver of the equipped vehicle;
wherein, with said exterior rearview mirror assembly mounted at the exterior portion of the side door of the equipped vehicle, said front surface of said glass substrate of said mirror reflective element is viewable by the driver of the equipped vehicle;
wherein, with said exterior rearview mirror assembly mounted at the exterior portion of the side door of the equipped vehicle, said electrically-operated actuator is electrically operable to move said mirror head relative to said mounting arm to vertically and horizontally adjust a rearward view provided by said mirror reflective element to the driver of the equipped vehicle who is viewing said mirror reflective element;
wherein said gap provides clearance between said mirror head and said mounting arm, and wherein said gap at said aperture and said gasket allow for movement of said mirror head relative to said mounting arm during electrical operation of said electrically-operated actuator; and
wherein movement of said mirror head moves said mirror attachment plate, said mirror reflective element and said mirror casing together in tandem.

17. The exterior rearview mirror assembly of claim 16, wherein said mirror head houses at least one accessory.

18. The exterior rearview mirror assembly of claim 16, wherein said mirror casing includes an outboard portion, and wherein a turn signal indicator is disposed at said outboard portion of said mirror casing.

19. The exterior rearview mirror assembly of claim 16, comprising a travel stop disposed at said actuator end of said mounting arm, wherein said travel stop limits movement of said mirror reflective element and said mirror casing relative to said mounting arm.

20. The exterior rearview mirror assembly of claim 16, comprising a travel stop disposed at said mirror attachment plate, wherein said travel stop limits movement of said mirror reflective element and said mirror casing relative to said mounting arm.

21. An exterior rearview mirror assembly configured for mounting at an exterior portion of a side door of a vehicle, said exterior rearview mirror assembly comprising:
- a mounting portion configured for mounting said exterior rearview mirror assembly at an exterior portion of a side door of a vehicle equipped with said exterior rearview mirror assembly;
- a mirror head comprising a mirror attachment plate, a mirror casing and a mirror reflective element;
- wherein said mirror reflective element has a front side and a rear side opposite said front side, and wherein said front side is separated from said rear side by a thickness dimension of said mirror reflective element;
- wherein said mirror reflective element comprises a glass substrate having a front surface and a rear surface and having a circumferential plate edge spanning between said front surface and said rear surface;
- wherein said front surface of said glass substrate is at said front side of said mirror reflective element;
- wherein said mirror head comprises a perimeter framing portion circumscribing said circumferential plate edge of said glass substrate;
- wherein no portion of said perimeter framing portion of said mirror head encroaches onto said front side of said mirror reflective element;
- wherein said mirror attachment plate has a first side and a second side, and wherein said first side is separated from said second side by a thickness dimension of said mirror attachment plate;
- wherein said rear side of said mirror reflective element is attached at said first side of said mirror attachment plate;
- an electrically-operated actuator;
- wherein said second side of said mirror attachment plate of said mirror head is attached at said electrically-operated actuator;
- wherein, with said exterior rearview mirror assembly mounted at the exterior portion of the side door of the equipped vehicle, said front side of said mirror reflective element is closer to a driver of the equipped vehicle than said rear side of said mirror reflective element and is contactable by the driver of the equipped vehicle;
- wherein, with said exterior rearview mirror assembly mounted at the exterior portion of the side door of the equipped vehicle, said front surface of said glass substrate of said mirror reflective element is viewable by the driver of the equipped vehicle;
- wherein, with said exterior rearview mirror assembly mounted at the exterior portion of the side door of the equipped vehicle, said electrically-operated actuator is electrically operable to move said mirror head to vertically and horizontally adjust a rearward view provided by said mirror reflective element to the driver of the equipped vehicle who is viewing said mirror reflective element;
- wherein movement of said mirror head moves said mirror attachment plate, said mirror reflective element and said mirror casing together in tandem;
- a mounting arm, wherein said mounting arm of said exterior rearview mirror assembly passes through an aperture of said mirror head, and wherein a gap exists where said mounting arm passes through said aperture of said mirror head, and wherein the gap allows movement of said mirror head relative to said mounting arm during electrical operation of said electrically-operated actuator when said mounting portion of said exterior rearview mirror assembly is mounted at the exterior portion of the side door of the equipped vehicle; and
- wherein a gasket spans said gap.

22. The exterior rearview mirror assembly of claim 21, wherein said exterior rearview mirror assembly comprises a powerfold mirror assembly that, with said exterior rearview mirror assembly mounted at the exterior portion of the side door of the equipped vehicle, provides a powerfold function that moves said mirror head between an extended position relative to the exterior portion of the side door of the equipped vehicle and a folded position relative to the exterior portion of the side door of the equipped vehicle.

23. The exterior rearview mirror assembly of claim 22, wherein the powerfold function is provided by said electrically-operated actuator.

24. The exterior rearview mirror assembly of claim 22, wherein the powerfold function is provided by another electrically-operated actuator of said exterior rearview mirror assembly.

25. The exterior rearview mirror assembly of claim 21, wherein said electrically-operated actuator is disposed at one end of a mounting arm of said exterior rearview mirror assembly, and wherein another electrically-operated actuator is disposed at another end of said mounting arm that, with said exterior rearview mirror assembly mounted at the exterior portion of the side door of the equipped vehicle, is closer to the exterior portion of the side door of the equipped vehicle than is the one end of the mounting arm of said exterior rearview mirror assembly at which said electrically-operated actuator is disposed.

26. The exterior rearview mirror assembly of claim 21, wherein said electrically-operated actuator is at least partially disposed in said mirror head.

27. The exterior rearview mirror assembly of claim 26, wherein said electrically-operated actuator comprises (i) at least two motors, each one at an angle to the other, and (ii) at least two gear trains, each one at an angle to the other.

28. The exterior rearview mirror assembly of claim 21, wherein said electrically-operated actuator allows for manual movement of said mirror head.

29. The exterior rearview mirror assembly of claim 21, wherein said exterior rearview mirror assembly is a breakaway exterior rearview mirror assembly.

30. The exterior rearview mirror assembly of claim 21, wherein said mirror head houses at least one accessory.

31. The exterior rearview mirror assembly of claim 30, wherein said accessory comprises a camera.

32. The exterior rearview mirror assembly of claim 30, wherein said accessory comprises a turn signal indicator.

33. The exterior rearview mirror assembly of claim 30, wherein said accessory comprises a blind spot indicator.

34. The exterior rearview mirror assembly of claim 30, wherein said accessory comprises a puddle lamp.

35. The exterior rearview mirror assembly of claim 30, wherein said rear side of said mirror reflective element is adhesively attached at said first side of said mirror attachment plate.

36. The exterior rearview mirror assembly of claim 35, wherein said mirror reflective element comprises an electrochromic mirror reflective element having a front substrate and a rear substrate with an electrochromic medium sandwiched therebetween, and wherein said front substrate comprises said glass substrate.

37. The exterior rearview mirror assembly of claim 35, wherein said perimeter framing portion provides a continuous transition from said front surface of said glass substrate of said mirror reflective element to an outer surface of said mirror casing.

38. The exterior rearview mirror assembly of claim 21, wherein said mirror head comprises at least two selected from the group consisting of (i) a camera (ii) a blind spot indicator, (iii) a turn signal indicator and (iv) a puddle lamp.

39. The exterior rearview mirror assembly of claim 38, wherein said perimeter framing portion comprises a portion of said mirror attachment plate.

40. The exterior rearview mirror assembly of claim 21, wherein said perimeter framing portion comprises a portion of said mirror attachment plate.

41. The exterior rearview mirror assembly of claim 21, wherein said mirror reflective element is adhesively attached at said first side of said mirror attachment plate.

42. The exterior rearview mirror assembly of claim 41, wherein a surface of said glass substrate is coated with a mirror reflector.

43. The exterior rearview mirror assembly of claim 42, wherein said mirror reflective element comprises an electrochromic mirror reflective element having a front substrate and a rear substrate with an electrochromic medium sandwiched therebetween, and wherein said front substrate comprises said glass substrate.

44. The exterior rearview mirror assembly of claim 41, wherein said perimeter framing portion at least partially supports said mirror reflective element.

45. The exterior rearview mirror assembly of claim 41, wherein said perimeter framing portion comprises a portion of said mirror casing.

46. The exterior rearview mirror assembly of claim 41, wherein said perimeter framing portion comprises a portion of said mirror attachment plate.

47. The exterior rearview mirror assembly of claim 41, wherein said electrically-operated actuator is at least partially disposed in said mirror head.

48. The exterior rearview mirror assembly of claim 41, wherein said front surface of said glass substrate is coated with a mirror reflector.

49. The exterior rearview mirror assembly of claim 21, wherein said electrically-operated actuator includes a base portion that is fixedly mounted at a mounting arm of said exterior rearview mirror assembly.

50. An exterior rearview mirror assembly configured for mounting at an exterior portion of a side door of a vehicle, said exterior rearview mirror assembly comprising:
a mounting portion configured for mounting at an exterior portion of a side door of a vehicle equipped with said exterior rearview mirror assembly;
a mirror head comprising a mirror attachment plate, a mirror casing and a mirror reflective element;
wherein said mirror reflective element has a front side and a rear side opposite said front side, and wherein said front side is separated from said rear side by a thickness dimension of said mirror reflective element;
wherein said mirror attachment plate has a first side and a second side, and wherein said first side is separated from said second side by a thickness dimension of said mirror attachment plate;
wherein said rear side of said mirror reflective element is attached at said first side of said mirror attachment plate;
an electrically-operated actuator attached at said second side of said mirror attachment plate;
a shroud extending from said mirror attachment plate at said mirror reflective element;
wherein said shroud spans a gap between said mirror reflective element and said mirror casing;
wherein said electrically-operated actuator is disposed at least partially in said mirror casing and is operably connected to said second side of said mirror attachment plate at said mirror reflective element;
wherein, with said mounting portion mounted at the exterior portion of the side door of the equipped vehicle, said front side of said mirror reflective element is closer to a driver of the equipped vehicle than said rear side of said mirror reflective element and is contactable by the driver of the equipped vehicle;
wherein, with said mounting portion mounted at the exterior portion of the side door of the equipped vehicle, said front side of said mirror reflective element is viewable by the driver of the equipped vehicle;
wherein, with said mounting portion mounted at the exterior portion of the side door of the equipped vehicle, and with said mirror reflective element in a centered orientation, said mirror reflective element is disposed outboard of said mirror casing, with said shroud spanning the gap between said mirror reflective element and said mirror casing and viewable between said mirror reflective element and said mirror casing; and
wherein, with said mounting portion mounted at the exterior portion of the side door of the equipped vehicle, said electrically-operated actuator is electrically operable to move said mirror reflective element to vertically and horizontally adjust a rearward view provided by said mirror reflective element to the driver of the equipped vehicle who is viewing said mirror reflective element.

51. The exterior rearview mirror assembly of claim 50, wherein said shroud is partially received in said mirror casing and tapers inward to allow for pivotal movement of said mirror reflective element and said shroud relative to said mirror casing without interference between said shroud and said mirror casing.

52. The exterior rearview mirror assembly of claim 50, wherein said shroud slides relative to an inner surface of said mirror casing when said mirror reflective element is moved by the driver of the equipped vehicle to adjust the driver's rearward view when said mounting portion of said exterior rearview mirror assembly is mounted at the exterior portion of the side door of the equipped vehicle.

53. The exterior rearview mirror assembly of claim 50, wherein said rear side of said mirror reflective element is adhesively attached at said first side of said mirror attachment plate.

54. An exterior rearview mirror assembly configured for mounting at an exterior portion of a side door of a vehicle, said exterior rearview mirror assembly comprising:
a mounting portion configured for mounting said exterior rearview mirror assembly at an exterior portion of a side door of a vehicle equipped with said exterior rearview mirror assembly;
a mirror head comprising a mirror attachment plate, a mirror casing and a mirror reflective element;
wherein said mirror reflective element has a front side and a rear side opposite said front side, and wherein said front side is separated from said rear side by a thickness dimension of said mirror reflective element;
wherein said mirror reflective element comprises a glass substrate having a front surface and a rear surface and having a circumferential plate edge spanning between said front surface and said rear surface;

wherein said front surface of said glass substrate is at said front side of said mirror reflective element;

wherein said mirror attachment plate has a first side and a second side, and wherein said first side is separated from said second side by a thickness dimension of said mirror attachment plate;

wherein said mirror attachment plate comprises a plastic molding;

wherein said rear side of said mirror reflective element is adhesively attached at said first side of said mirror attachment plate;

wherein a heater pad is disposed between said rear side of said mirror reflective element and said first side of said mirror attachment plate;

wherein, with said exterior rearview mirror assembly mounted at the exterior portion of the side door of the equipped vehicle, said front side of said mirror reflective element is closer to a driver of the equipped vehicle than said rear side of said mirror reflective element and is contactable by the driver of the equipped vehicle;

wherein, with said exterior rearview mirror assembly mounted at the exterior portion of the side door of the equipped vehicle, said front surface of said glass substrate of said mirror reflective element is viewable by the driver of the equipped vehicle;

wherein said mirror head comprises a perimeter framing portion circumscribing said circumferential plate edge of said glass substrate, and wherein no portion of said perimeter framing portion of said mirror head encroaches onto said front side of said mirror reflective element, and wherein said perimeter framing portion comprises a portion of said mirror attachment plate;

an electrically-operated actuator;

wherein said electrically-operated actuator comprises two motors;

wherein, with said exterior rearview mirror assembly mounted at the exterior portion of the side door of the equipped vehicle, said electrically-operated actuator is electrically operable to move said mirror head relative to the exterior portion of the side door of the equipped vehicle at which said mounting portion of said exterior rearview mirror assembly is mounted;

wherein, with said exterior rearview mirror assembly mounted at the exterior portion of the side door of the equipped vehicle, electrical operation of said electrically-operated actuator moves said mirror head to vertically and horizontally adjust a rearward view provided by said mirror reflective element to the driver of the equipped vehicle who is viewing said mirror reflective element;

wherein movement of said mirror head moves said mirror attachment plate, said mirror reflective element and said mirror casing together in tandem;

wherein a mounting arm of said exterior rearview mirror assembly passes through an aperture of said mirror head;

wherein a gap exists where said mounting arm passes through said aperture of said mirror head, and wherein the gap allows movement of said mirror head relative to said mounting arm during electrical operation of said electrically-operated actuator when said mounting portion of said exterior rearview mirror assembly is mounted at the exterior portion of the side door of the equipped vehicle;

wherein said electrically-operable actuator includes a portion that is fixedly mounted at one end of said mounting arm and wherein said mounting portion configured for mounting said exterior rearview mirror assembly at the exterior portion of the side door of the equipped vehicle comprises another end of said mounting arm; and wherein said second side of said mirror attachment plate of said mirror head is attached at said electrically-operated actuator that is disposed at the one end of said mounting arm of said exterior rearview mirror assembly.

55. The exterior rearview mirror assembly of claim 54, wherein said front surface of said glass substrate is coated with a mirror reflector.

56. The exterior rearview mirror assembly of claim 54, wherein said mirror reflective element comprises an electrochromic mirror reflective element having a front substrate and a rear substrate with an electrochromic medium sandwiched therebetween, and wherein said front substrate comprises said glass substrate.

57. The exterior rearview mirror assembly of claim 54, wherein said electrically-operable actuator is at least partially disposed in said mounting arm.

58. The exterior rearview mirror assembly of claim 55, wherein another electrically-operated actuator is disposed at where, with said exterior rearview mirror assembly mounted at the exterior portion of the side door of the equipped vehicle, said mounting portion mounts at the exterior portion of the side door of the equipped vehicle, and wherein the other electrically-operated actuator, when electrically operated, moves said mirror head between an extended position relative to the exterior portion of the side door of the equipped vehicle and a folded position relative to the exterior portion of the side door of the equipped vehicle.

59. The exterior rearview mirror assembly of claim 56, wherein another electrically-operated actuator is disposed at where, with said exterior rearview mirror assembly mounted at the exterior portion of the side door of the equipped vehicle, said mounting portion mounts at the exterior portion of the side door of the equipped vehicle, and wherein the other electrically-operated actuator, when electrically operated, moves said mirror head between an extended position relative to the exterior portion of the side door of the equipped vehicle and a folded position relative to the exterior portion of the side door of the equipped vehicle.

60. The exterior rearview mirror assembly of claim 54, wherein said mirror head comprises a CMOS camera.

61. The exterior rearview mirror assembly of claim 54, wherein said mirror head comprises a turn signal indicator.

62. The exterior rearview mirror assembly of claim 54, wherein said mirror head comprises a blind spot indicator.

63. The exterior rearview mirror assembly of claim 54, wherein said mirror head comprises a puddle lamp.

64. The exterior rearview mirror assembly of claim 54, wherein said exterior rearview mirror assembly is a breakaway exterior rearview mirror assembly.

65. The exterior rearview mirror assembly of claim 64, wherein said exterior rearview mirror assembly is a power-fold exterior rearview mirror assembly.

* * * * *